(12) United States Patent
Matsunoshita

(10) Patent No.: US 7,729,018 B2
(45) Date of Patent: Jun. 1, 2010

(54) IMAGE PROCESSING SYSTEM, IMAGE FORMING APPARATUS, IMAGE PROCESSING METHOD AND PROGRAM RECORDING MEDIUM

(75) Inventor: Junichi Matsunoshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 981 days.

(21) Appl. No.: 11/491,058

(22) Filed: Jul. 24, 2006

(65) Prior Publication Data

US 2007/0171452 A1 Jul. 26, 2007

(30) Foreign Application Priority Data

Jan. 25, 2006 (JP) ............................. 2006-015844

(51) Int. Cl.
*H04N 1/04* (2006.01)
(52) U.S. Cl. .................. 358/474; 358/1.14; 358/1.15; 358/540; 358/448; 382/232; 382/298; 382/312; 348/207.99; 348/E5.029
(58) Field of Classification Search ............. 358/1.14, 358/462, 539, 540, 450, 451, 448, 474, 486; 382/232, 298, 299, 312, 284; 348/207.99, 348/E5.029, E9.01
See application file for complete search history.

(56) References Cited

U.S. PATENT DOCUMENTS

| | | | | |
|---|---|---|---|---|
| 5,416,606 A * | 5/1995 | Katayama et al. | ........... | 382/239 |
| 6,681,056 B1 * | 1/2004 | Tseng et al. | ................ | 382/282 |
| 6,891,642 B1 * | 5/2005 | Shigehiro | ................... | 358/450 |
| 7,116,448 B1 * | 10/2006 | Fujiwara | ..................... | 358/3.2 |
| 7,663,779 B2 * | 2/2010 | Nagao et al. | ................. | 358/1.2 |
| 2004/0042047 A1 * | 3/2004 | Kawatoko et al. | .......... | 358/3.06 |
| 2006/0044636 A1 * | 3/2006 | Iinuma et al. | ............... | 358/540 |
| 2006/0181737 A1 * | 8/2006 | Kakutani | ................... | 358/3.03 |
| 2007/0070423 A1 * | 3/2007 | Kakutani | ................... | 358/3.01 |
| 2007/1007042 * | 3/2007 | Kakutani | ................... | 358/3.01 |
| 2007/0103564 A1 * | 5/2007 | Chiba | ..................... | 348/223.1 |
| 2007/0133036 A1 * | 6/2007 | Matsunoshita et al. | ..... | 358/1.14 |

FOREIGN PATENT DOCUMENTS

| JP | A 2003-280469 | 10/2003 |
|---|---|---|
| JP | A 2004-128845 | 4/2004 |
| JP | A 2004-166180 | 6/2004 |

* cited by examiner

*Primary Examiner*—Negussie Worku
(74) *Attorney, Agent, or Firm*—Oliff & Berridge, PLC

(57) ABSTRACT

An image processing system includes a pattern detecting unit that detects a plurality of patterns included in a read image, a magnification determining unit that determines a magnification of the reading the read image on the basis of positional relation between adjacent patterns out of the plurality of patterns detected by the pattern detecting unit, and an information detecting unit that detects information from the read image on the basis of the magnification determined by the magnification determining unit.

9 Claims, 24 Drawing Sheets

IMAGE PROCESSING SYSTEM 2

IMAGE PROCESSING PROGRAM 4

BASE PATTERN IMAGE GENERATING UNIT 46

SHIFT BY TWO PIXELS DOWNWARD

SHIFT BY TWO PIXELS UPWARD

12 PIXELS

BACKGROUND BASE PATTERN IMAGE GENERATING PROCESS
S10

PRINTING PROCESS
S20

FIRST TRACKING INFORMATION DECODING PROCESS
S30

TRACKING INFORMATION DETECTION PROCESS
S50

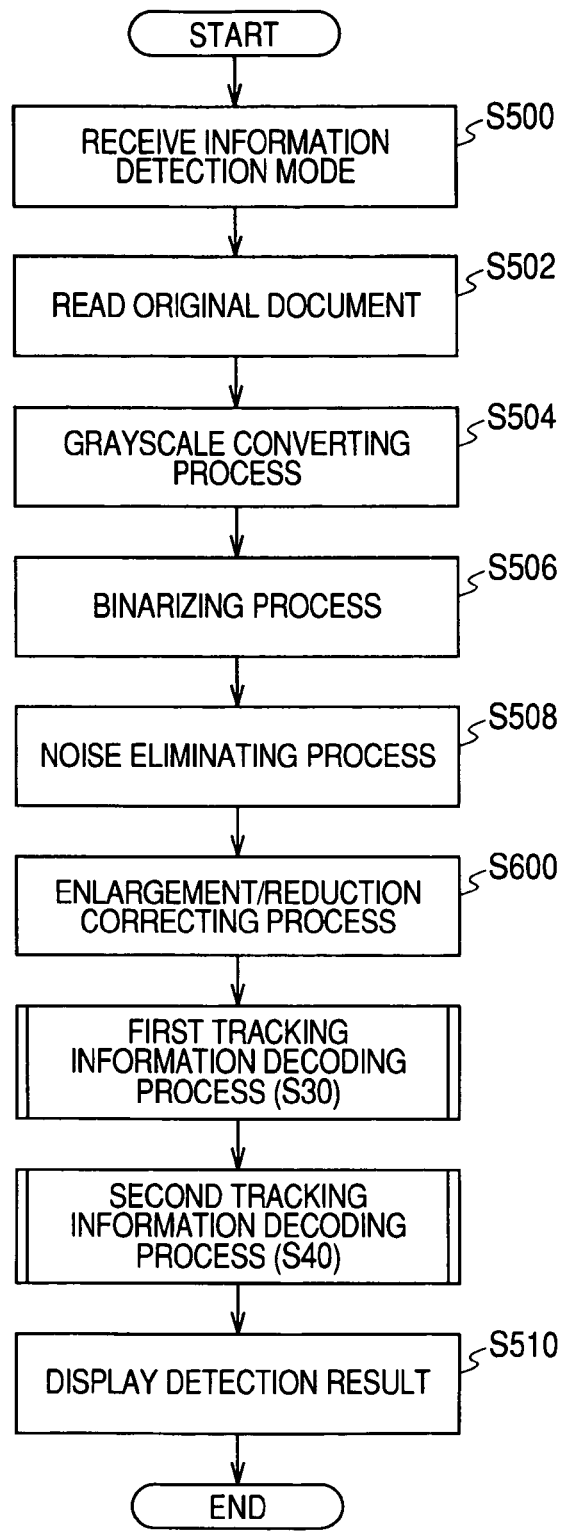

IMAGE PROCESSING SYSTEM, IMAGE FORMING APPARATUS, IMAGE PROCESSING METHOD AND PROGRAM RECORDING MEDIUM

BACKGROUND (1). Technical Field

The present invention relates to an image processing system, an image forming apparatus, an image processing method, and a program recording medium for embedding information in an image and detecting the information from a printed document in which the information is embedded.

(2). Related Art

In recent years, a problem of information leaks due to fraudulent reproduction of printed confidential document in association with widespread usage of personal computers, printers, and copying machines. In order to avoid the fraudulent reproduction of the confidential document, a method of embedding and outputting information relating a user who performs a printing operation, date and time information, identification of outputted equipment, and so on (hereinafter referred to as tracking information) in the confidential document at the time of printing, and reading the printed original document with a scanner or the like to estimate a source of information leaks by analyzing the user, the client PC, the printer, the date and time, and so on embedded in the read image is well known.

The method of preventing information leaks as described above requires a capability of credible reading of the tracking information embedded in the document. In addition, it is required to be capable of reading the tracking information not only from the original document in which the tracking information is embedded when they are printed out, but also from copy of the original document reproduced by the copying machine.

SUMMARY

According to an aspect of the invention, there is provided an image processing system including: a pattern detecting unit that detects a plurality of patterns included in a read image;

a magnification determining unit that determines a magnification of the reading the read image on the basis of positional relation between adjacent patterns out of the plurality of patterns detected by the pattern detecting unit; and an information detecting unit that detects information from the read image on the basis of the magnification determined by the magnification determining unit.

BRIEF DESCRIPTION OF THE DRAWINGS

Exemplary embodiments of the invention will be described in detail based on the following figures, wherein:

FIG. 6A illustrates a first code generated by a first encoding unit 460;

FIG. 6B illustrates a second code generated by a second encoding unit 464;

FIGS. 8A to 8C illustrate a method of adjusting the position of the patterns by a pattern position modulating unit 470, in which FIG. 8A illustrates a pattern set including adjacent patterns, FIG. 8B shows a pattern set in which the distance between the patterns is adjusted by the pattern position modulating unit 470, and FIG. 8C shows a pattern set in which the distance between the patterns is adjusted by the pattern position modulating unit 470;

FIGS. 9A to 9C illustrate a printed document on which a background base pattern image generated by the image processing system 2 is printed, in which FIG. 9A illustrates a printed document on which a background base pattern image is printed, FIG. 9B illustrates a copy of this printed document, and FIG. 9C illustrates a drawing showing the background base pattern image in which an area S in FIG. 9A is enlarged;

FIG. 14A to 14D illustrate Hough conversion performed by a angular magnification detecting unit 580, in which FIG. 14A illustrates image data (pattern data) stored in a buffer memory 572, FIG. 14B illustrates a Hough space after a Hough conversion is applied on all the patterns, FIG. 14C illustrates a projection distribution on an angle θ axis, and FIG. 14D illustrates a waveform in the direction of a distance ρ on an angle θ skew;

FIG. 24 is a flowchart showing a tracking information detection process (S60) by the image processing system 2 according to an exemplary embodiment of the invention.

DETAILED DESCRIPTION

Figure 1A:
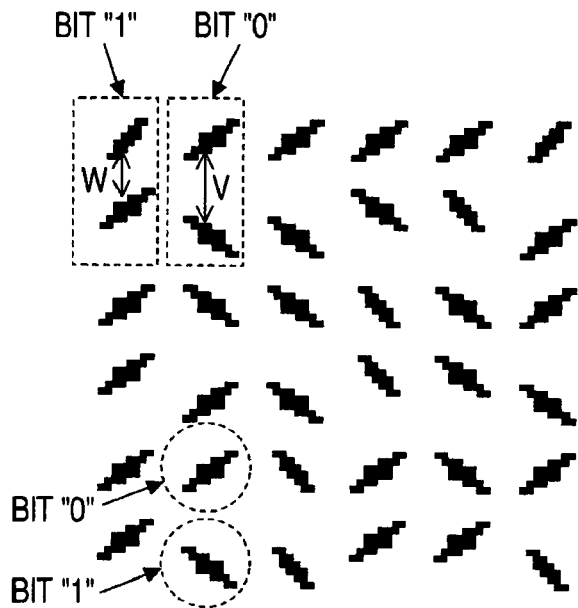
FIGS. 1A and 1B illustrate a method of embedding tracking information by an image processing system according to an exemplary embodiment of the invention, in which FIG. 1A exemplifies a printed original document, and FIG. 1B exemplifies an image of the original document copied in an enlarged scale.
Figure 1B:
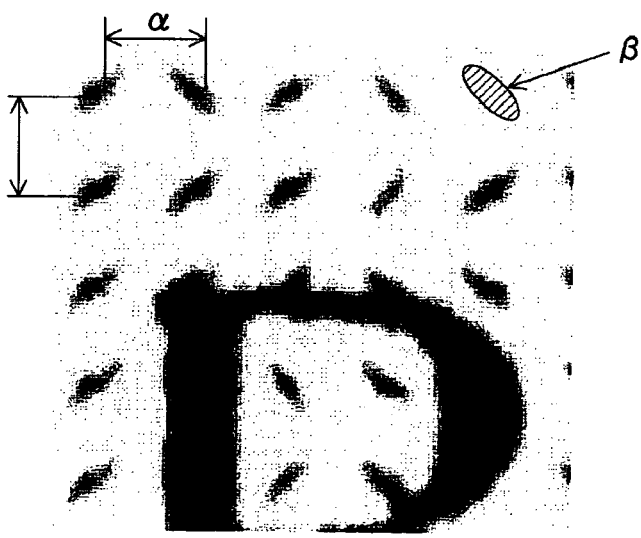

FIGS. 1A and 1B illustrate a method of embedding tracking information with an image processing system according to an aspect of the invention, wherein FIG. 1A exemplifies a printed original document, and FIG. 1B exemplifies an image of the original document copied in an enlarged scale. The tracking information may include, for example, information relating a user who performs a printing operation, date and time information, identification of outputted equipment, and so on.

As shown in FIG. 1A, the image processing system according to an aspect of the invention generates a pattern image including plural minute patterns arranged and embeds information including tracking information by a positional relation between adjacent patterns.

The pattern is arranged in gridiron and information is embedded by shifting the respective patterns at least one of the vertical direction and the lateral direction. The information may be embedded by dividing the patterns into sets of two adjacent patterns and fixing one of each set and shifting the other one of each set in at least one of the vertical direction and the lateral direction. The shifting direction of the pattern, the positional relation between the set of the patterns and the number of patterns included in the set are not limited to the example shown here.

For example, in FIG. 1A, patterns arranged adjacently in the vertical direction are assigned as a set and, out of plural patterns arranged in gridiron, patterns on the odd levels (patterns arranged on the upper side of the pairs) are fixed and patterns on the even levels (patterns arranged on the lower side of the pairs) are moved in the vertical direction, and information is embedded by the positional relation between the two patterns included in the pair. In this example, when the distance between two patterns is longer as shown by an arrow v in the drawing, the pair of the pattern shows bit "0", and when the distance between the two patterns is shorter as shown by an arrow w, the pair of the pattern shows bit "1".

The image processing system according to an aspect of the invention, information is further embedded by the shapes of the respective minute patterns. In this example, the pattern having a shape inclining upward toward the right shows bit "0", and the pattern having a shape inclining downward toward the right shows bit "1".

In the image processing system according to an aspect of the invention, loosening of the pattern at the time of copying is prevented by adjusting the thickness (density of the background) of the pattern. The image processing system may embed information that is wanted to be kept infallibly even when being copied (for example, tracking information) from the positional relation of the patterns, and other information (for example, terms of copy permission) may be embedded by the shapes of the pattern.

When the document in which information is embedded in this manner is copied in an enlarged scale as shown in FIG. 1B, the image processing system according to this exemplary embodiment determines the magnification of the enlarged copy on the basis of at least one of the positional relation between the adjacent patterns (α in the drawing), the surface area of the pattern (β in the drawing), and Hough conversion, and detects information from the read image on the basis of this magnification.

Subsequently, exemplary embodiments of the invention will be described.

Figure 2:
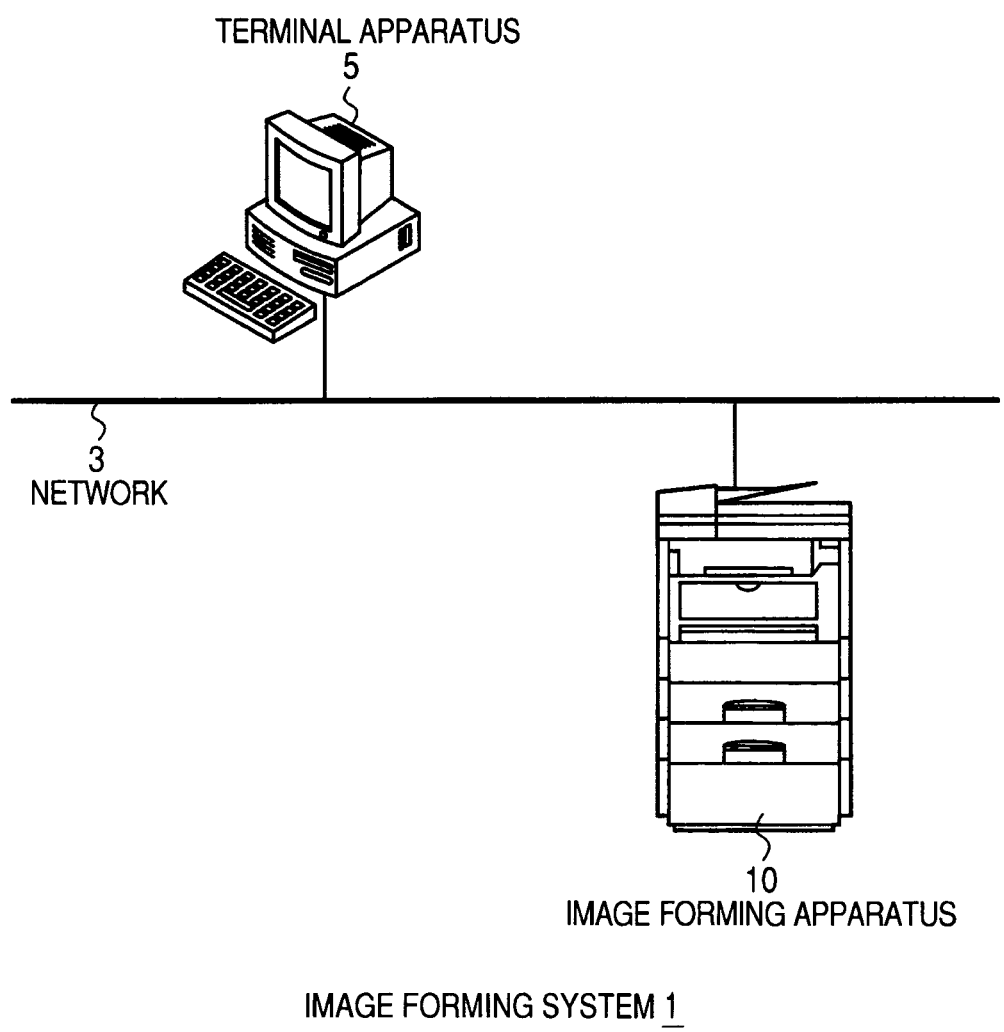
FIG. 2 shows an image forming system 1 including an image forming apparatus 10.

FIG. 2 shows an image forming system 1 including an image forming apparatus 10.

As shown in FIG. 2, the image forming system 1 includes the image forming apparatus 10 and a terminal apparatus 5 such as the personal computer (PC) connected via a network 3.

The terminal apparatus 5 displays an image on a display apparatus, and transmits the image data to the image forming apparatus 10 to request printing. The terminal apparatus 5 may be a terminal that has a transmitting device for sending and receiving a signal via the network 3 and is not a PC. The network 3 may be composed of a fixed line or a radio transmission. Plural terminal apparatuses 5 and the image forming apparatus 10 may be connected to the network 3.

Figure 3:
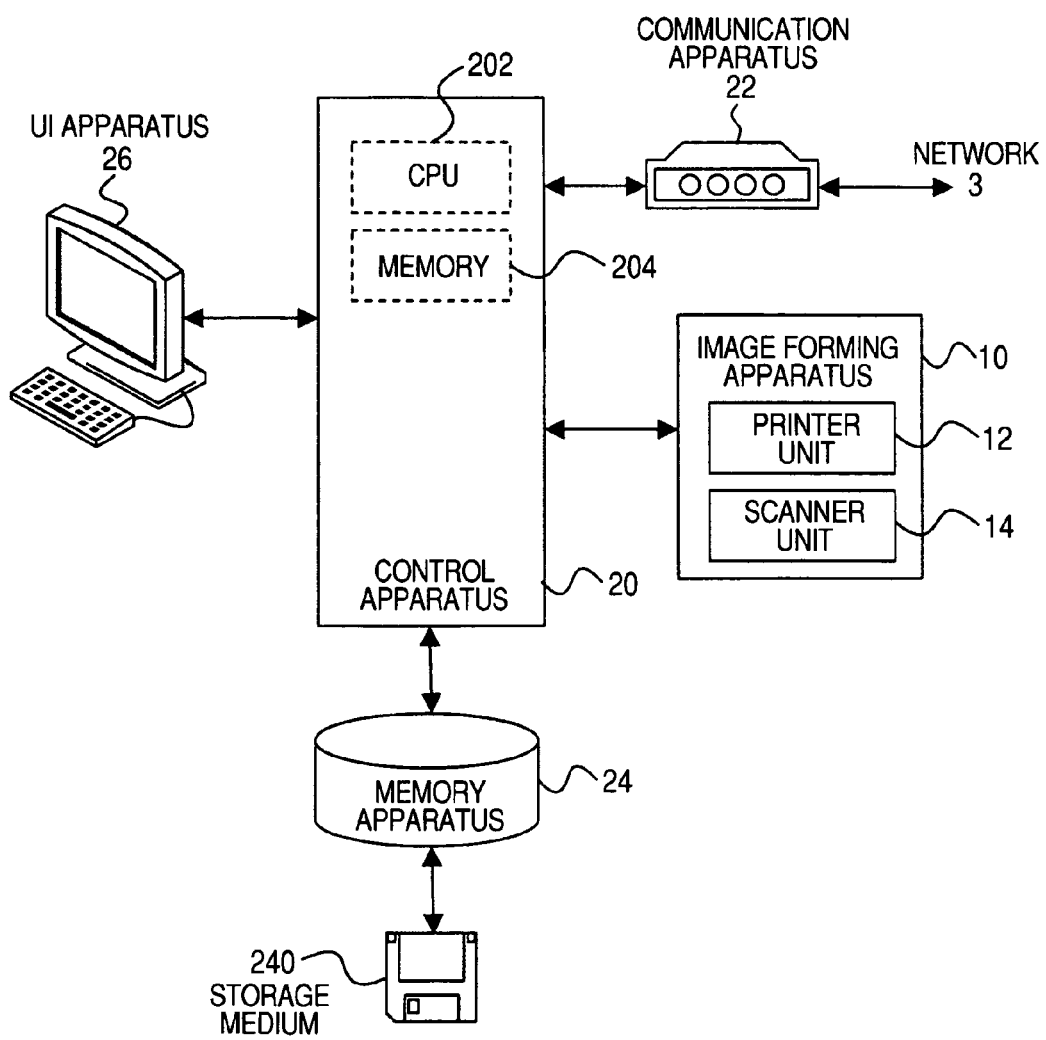
FIG. 3 is a drawing showing a hardware configuration of an image processing system 2 to which an image processing method according to an exemplary embodiment of the invention is applied with a control apparatus 20 shown at a center.

FIG. 3 is a drawing showing a hardware configuration of an image processing system 2 to which the image processing method according to an aspect of the invention is applied with a control apparatus 20 shown at a center.

As shown in FIG. 3, the image forming apparatus 10 includes a printer unit 12, a scanner unit 14 and an image processing system 2. The printer unit 12 prints and records an image data on which a predetermined image processing is applied by the image processing system 2 onto a paper and outputs the same. The scanner unit 14 reads an original document placed on a platen under the control of the control apparatus 20, and outputs the image data to the image processing system 2.

The image processing system 2 includes the control apparatus 20 including a CPU 202 and a memory 204, a communication apparatus 22 for sending and receiving data via the network 3, a memory apparatus 24 such as HDD, CD and DVD apparatus, and the LCD display apparatus, or the CRT display apparatus and the keyboard or the touch panel, and a user interface apparatus for accepting an operation from a user (UI apparatus) 26 is also included. The image processing system 2 is a multi-purpose computer in which an image processing program 4 described later is installed.

Figure 4:
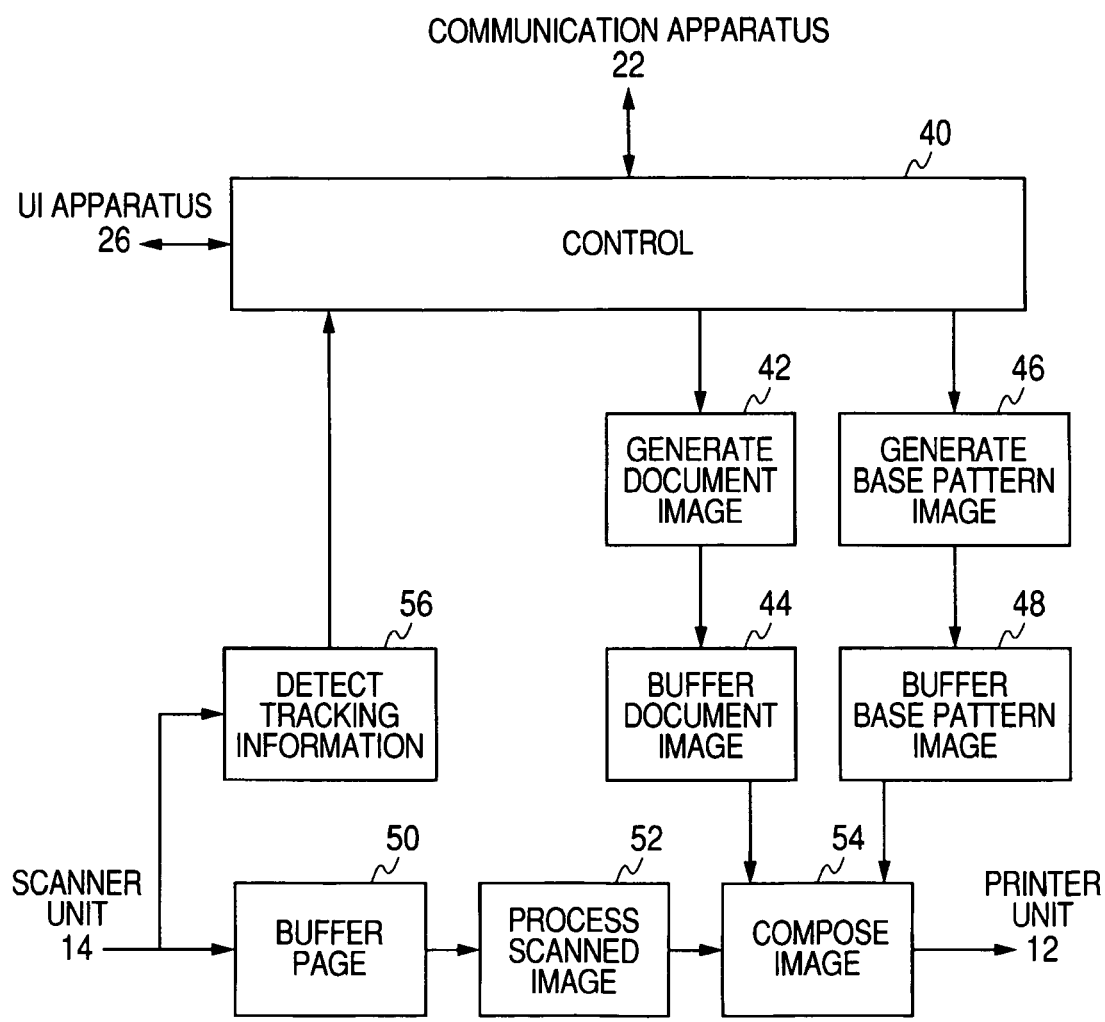
FIG. 4 shows a functional configuration of an image processing program 4 which is implemented by the control apparatus 20 to realize the image processing method according to an exemplary embodiment of the invention.

FIG. 4 shows a functional configuration of the image processing program 4 which is implemented by the control apparatus 20 to realize the image processing method according to an aspect of the invention.

As shown in FIG. 4, the image processing program 4 includes a controller 40, a document image generating unit 42, a document image buffer 44, a base pattern image generating unit 46, a base pattern image buffer 48, a page buffer 50, a scanned image processing unit 52, an image composing unit 54, and a tracking information detecting unit 56. All or a part of function of the image processing program 4 may be realized by a hardware such as ASIC provided in the image forming apparatus 10.

The image processing program 4, having the configuration as described above, generates a code image which includes plural patterns having different shapes and indicates predetermined information by positional relation between the adjacent patterns, and composes the generated code image and the document image. The image processing program 4 detects plural patterns included in the image read by the image forming apparatus 10, determines the magnification on the basis of a size of the detected pattern, and detects information from the read image on the basis of the determined magnification and the positional relation between the adjacent patterns.

In the image processing program 4, the controller 40 controls the printer unit 12, the scanner unit 14, and other components. The controller 40 transmits data via the communication apparatus 22, accepts an operation from the user via the UI apparatus 26 and outputs the same to the respective components, and displays the output results from the respective components on the UI apparatus 26. More specifically, the controller 40 accepts document data of the printing object transmitted via the network 3 from the terminal apparatus 5 via the communication apparatus 22. Here, the document data is, for example, of PDL (Printed Description Language) form.

The controller 40 displays information detected by the tracking information detecting unit 56, described later (tracking information or the like) on the UI apparatus 26. In addition, the controller 40 may extract job log ID from the detected tracking information. When the extracted job log ID exists in the job log data in the interior of the image forming apparatus 10, the controller 40 displays the document image data or thumbnail thereof, the document image data corresponds to the job log data or the job log ID on the UI apparatus 26.

The document image generating unit 42 performs a drawing process on the document data of the PDL form supplied from the controller 40 to generate the document image data. More specifically, the document image generating unit 42 performs interpretation of the PDL and development (rasterize) to a YMCK full color image data. The document image generating unit 42 stores the rasterized document image data in the document image buffer 44.

The document image buffer 44 stores the document image data generated by the document image generating unit 42. The document image buffer 44 is realized by a memory, a hard disk drive, and so on.

The base pattern image generating unit 46 is controlled by the controller 40, generates the background base pattern image data, and stores the same in the base pattern image buffer 48. More specifically, when the background base pattern image composing mode is set by an administrator or the like in advance, the base pattern image generating unit 46 generates a background base pattern image based on the additional information set by the controller 40. For example, the background base pattern image data is binary image data, and the resolution of the background base pattern image is the same as a resolution of the printer unit 12 (for example, 600 dpi).

The additional information includes the tracking information and latent information set in advance. The tracking information includes first tracking information and second tracking information, and the latent information may include latent image character string information, latent image picture information, tone value information, and so on. The first tracking information may include, for example, information added in a header of the sent document, like an IP address of a sender, a PC client name of the sender, a user name and a document name of the sender, an image forming apparatus ID allocated for each image forming apparatus, copy prohibition/permission information set in advance by the administrator or the like, and date and time of initiation of output acquired from a timer provided in the controller 40. The second tracking information may include, for example, a unique job log ID assigned upon reception of a printing job. The image including the second tracking information embedded therein is uniquely identified by the job log ID. The second tracking information may include at least a part of at least the first tracking information.

The background base pattern image generating process will be described later.

The base pattern image buffer 48 stores the background base pattern image data generated by the base pattern image generating unit 46. The base pattern image buffer 48 is realized in the same manner as the document image buffer 44.

When the background base pattern image composing mode is set by the administrator or the like in advance, the image composing unit 54 reads out the document image and the background base pattern image respectively from the document image buffer 44 and the base pattern image buffer 48 respectively synchronously with the printer unit 12, composes the background base pattern image with a preset color component of the document image via OR-composition, and outputs the same to the printer unit 12. The image composing unit 54 accepts the image data supplied from the scanner unit 14 from the scanned image processing unit 52 described later, composing this image with the background base pattern image, and outputs the same to the printer unit 12. On the other hand, when the background base pattern non-composition mode is set, the image composing unit 54 reads out the document image from the document image buffer 44 synchronously with the printer unit 12, and outputs the same to the printer unit 12.

The tracking information detecting unit 56 accepts the image data read by the scanner unit 14, detects the information embedded in the image (including the tracking information), and outputs the detected information to the controller 40. When no information is detected from the image, the tracking information detecting unit 56 informs the detection result to the controller 40. The information detecting method will be described later.

The page buffer 50 stores image data read by the scanner unit 14. The page buffer 50 realizes in the same manner as the document image buffer 44.

The scanned image processing unit 52 is controlled by the controller 40, reads out the image from the page buffer 50 at a predetermined timing, performs image processing such as a color-converting process and a tone correcting process on the image, and outputs the same to the image composing unit 54.

Figure 5:
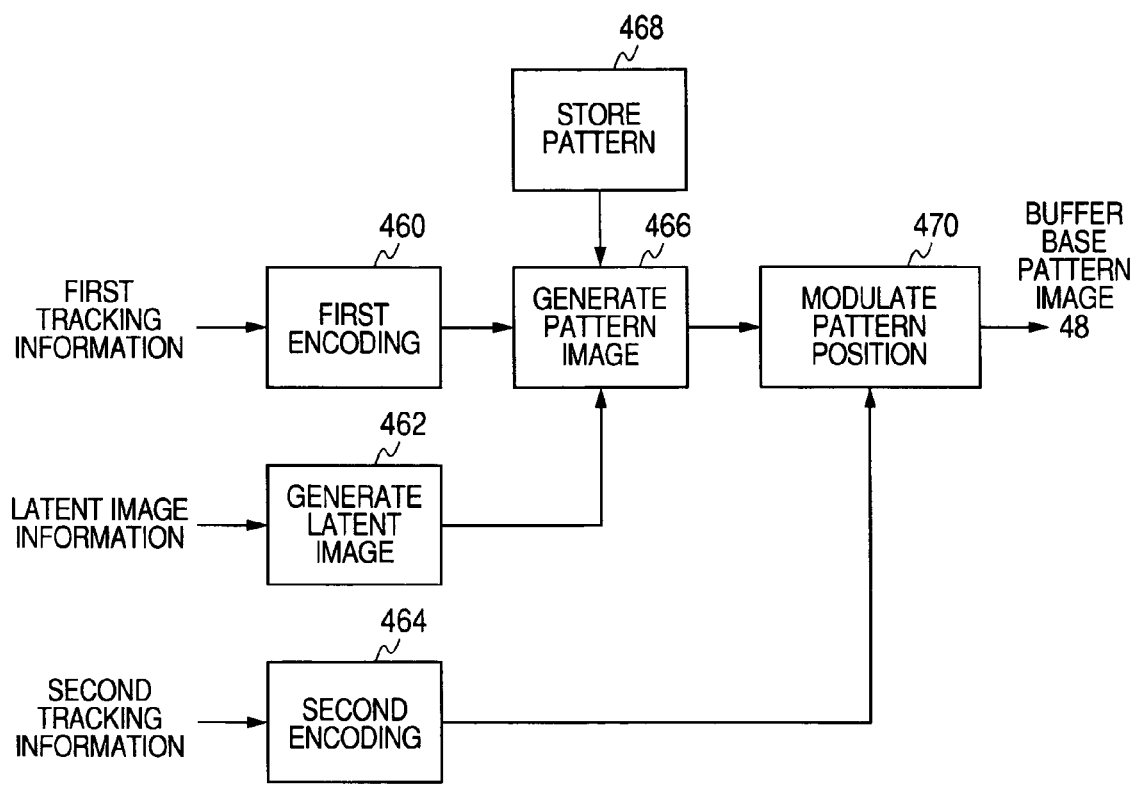
FIG. 5 illustrates a base pattern image generating unit 46 in detail.

FIG. 5 illustrates the base pattern image generating unit 46 in detail.

As shown in FIG. 5, the base pattern image generating unit 46 includes a first encoding unit 460, a latent image generating unit 462, a second encoding unit 464, a pattern image generating unit 466, a pattern memory 468, and pattern position modulating unit 470. By these components, the base pattern image generating unit 46 configures a code image generating device that generates a code image (that is, the background base pattern image) which includes plural patterns having different shapes and indicates a predetermined information by positional relation between adjacent patterns.

The latent image generating unit 462 generates the latent image on the basis of the latent information supplied from the controller 40. The latent information indicates the type of the latent image character or the like to be embedded in the pattern image and, more specifically, includes a character string of the latent image, a font type, a font size, a direction of latent image character string (angle) and so on. Upon reception of the latent image information, the latent image generating unit 462 draws the latent image character string in a specified font type and font size in a specified direction, and generates a binary latent image. The resolution of the latent image is a resolution which is obtained by dividing the resolution of the printer by the pattern size. For example, in a case where the printer resolution is 600 DPI and the pattern size is 12 pixels×12 pixels, the resolution of the latent image is 50 DPI. The latent image generating unit 462 outputs the generated latent image to the pattern image generating unit 466.

The first encoding unit 460 performs error correcting encoding for the supplied first tracking information, and a bit array after error correcting encoding is arranged into a two-dimensional array, so that a bit array of a predetermined size including an array of bit "0" and bit "1" (first code) is generated. The first encoding unit 460 arranges the first code repeatedly in the vertical and lateral direction, and generates the bit array having the same size as the latent image generated by the latent image generating unit 462 (first bit array). The first encoding unit 460 outputs the generated first bit array to the pattern image generating unit 466. The first code will be described in detail later.

The second encoding unit 464 performs the error correcting encoding on the supplied second tracking information, and arranges the bit array after the error correcting encoding into a two-dimensional array, and generates a code including an array of bit "0" and bit "1" (second code). The second encoding unit 464 arranges the generated second code repeatedly in the vertical and lateral direction, and generates the bit array of the same size as the latent image (second bit array). The second encoding unit 464 outputs the generated second bit array to the pattern position modulating unit 470. The second code will be described in detail later.

The pattern image generating unit 466 generates a pattern image on the basis of a latent image generated by the latent image generating unit 462, a first bit array generated by the fist encoding unit 460, and a pattern, described later, stored in the pattern memory 468. The pattern image generating unit 466 outputs the generated pattern image to the pattern position modulating unit 470. The pattern image generating process will be described in detail later.

The pattern position modulating unit 470 adjusts the positional relation between the adjacent patterns of the pattern image generated by the pattern image generating unit 466 on the basis of the second bit array generated by the second encoding unit 464 and generates the background base pattern image. At this time, the pattern position modulating unit 470 adjusts the distance between the patterns being adjacent in the vertical direction. The pattern position modulating unit 470 may adjust the distance between the patterns being adjacent in the lateral direction. Here, the one bit of the second bit array corresponds to a set of two vertically adjacent patterns in the pattern image (for example, 12 pixels×24 pixels). The pattern position modulating unit 470 stores the generated background base pattern image in the base pattern image buffer 48. The method of adjusting the pattern position will be described in detail later.

Figures 6A, 6B:
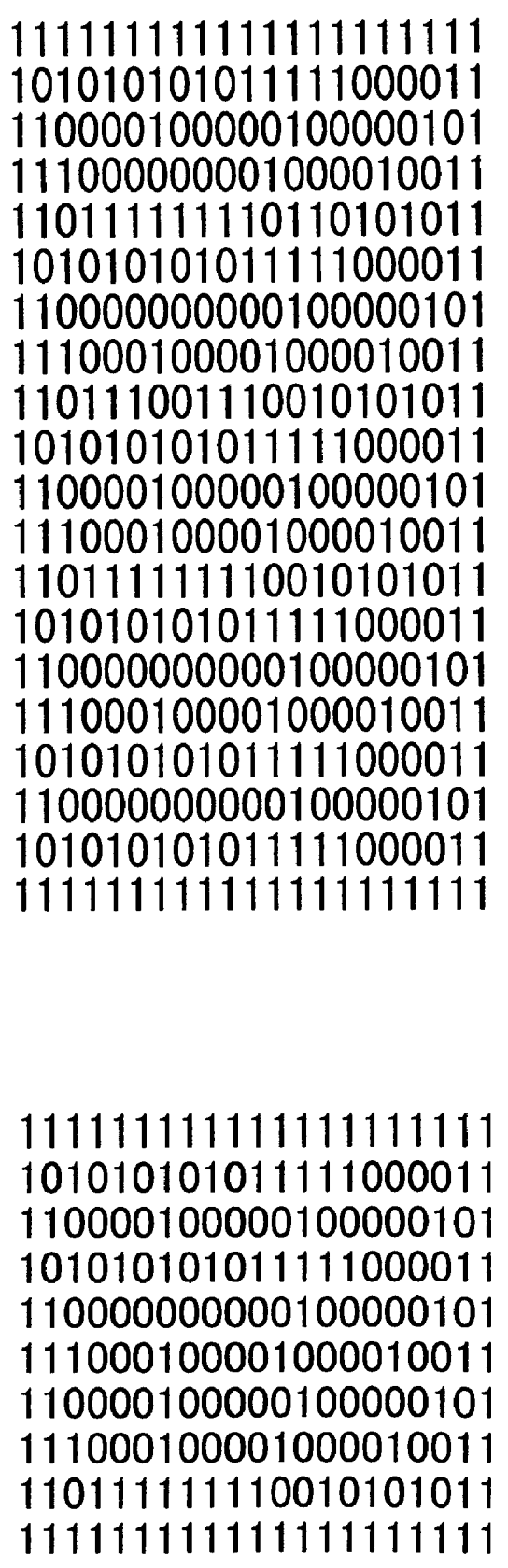

FIG. 6A and 6B illustrate the first code and the second code, and FIG. 6A illustrates the first code generated by the first encoding unit 460 and FIG. 6B illustrates the second code generated by the second encoding unit 464.

As shown in FIG. 6A, the first code is a bit array including "0" and "1". In the first code, the respective bits on the outer periphery thereof is a synchronous bit (synchronous code) showing a first code clipping position when the information is detected and, for example, all of them are "1".

As shown in FIG. 6B, the second code is also a bit array including "0" and "1". In the second code as well, the respective bits on the outer periphery thereof are the synchronous bits indicating the second code clipping position when detecting the information and, for example, all of them are "1". In this example, the size of the second code in the vertical direction is a half that of the first code.

Figure 7A:
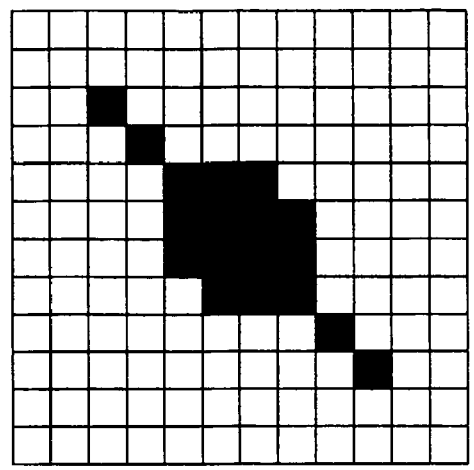
FIGS. 7A to 7C show patterns stored in a pattern memory 468 and referenced by a pattern image generating unit 466.
Figure 7B:
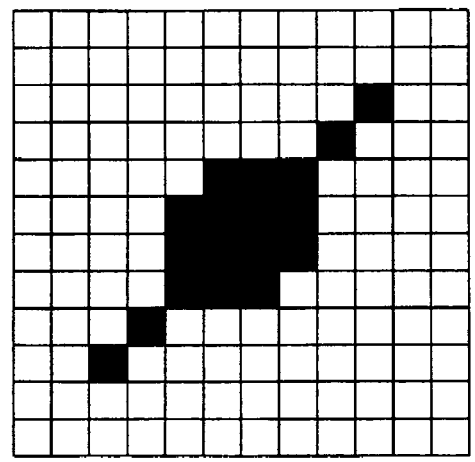
Figure 7C:
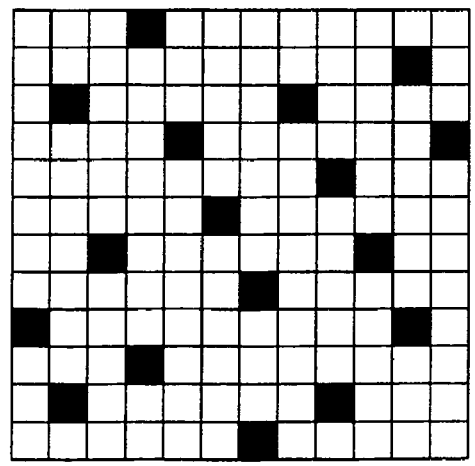

FIGS. 7A to 7C show patterns stored in the pattern memory 468 and referenced by the pattern image generating unit 466.

The pattern image generating unit 466 references the latent image and the first bit array, for example, from the upper left in sequence, selects one of the patterns (FIGS. 7A to 7C) stored in the pattern memory 468 on the basis of the pixel value of the latent image and the bit value of the first bit array, and generates the pattern image.

Here, when the latent image is a white pixel and the bit value of the first bit array is "1", the pattern shown in FIG. 7A is selected.

When the latent image is a white pixel and the bit value of the first bit array is "0", the pattern shown in FIG. 7B is selected.

When the latent image is a black pixel, the pattern shown in FIG. 7C is selected.

A portion of character in the latent image of the generated pattern image is converted into an isolated dot pattern (FIG. 7C), and a background portion of the latent image is converted into a hatched pattern (FIGS. 7A, B) corresponding to the bit value ("0" or "1") of the first code. Therefore, the pattern image is generated so that one pixel of the latent image corresponds to one pattern of the 12 pixels×12 pixels. Therefore, the resolution of the pattern image corresponds to the resolution of the printer. For example, when the latent image is 50 DPI, the pattern image is 50 DPI×12 pixels=600 DPI. In this manner, the pattern image generating unit 466 arranges plural patterns of different shapes and configures a pattern arranging device.

Figure 8C:
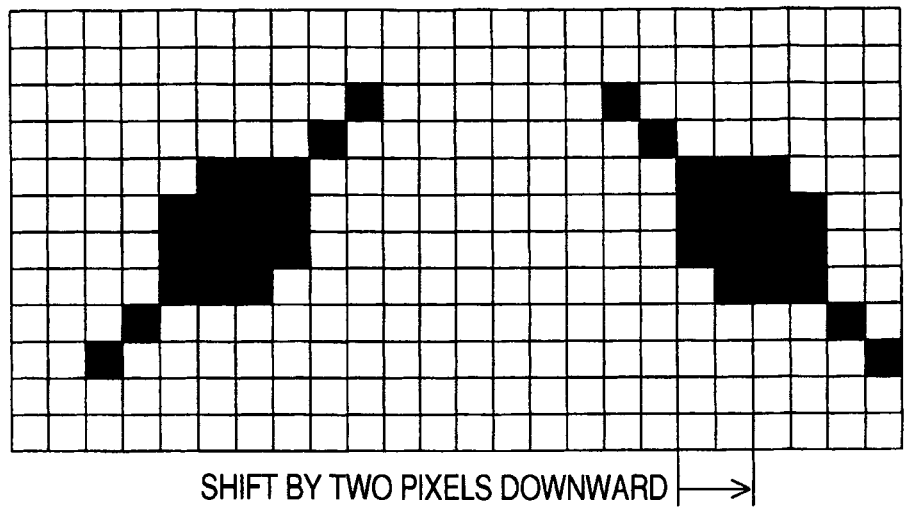
Figure 8B:
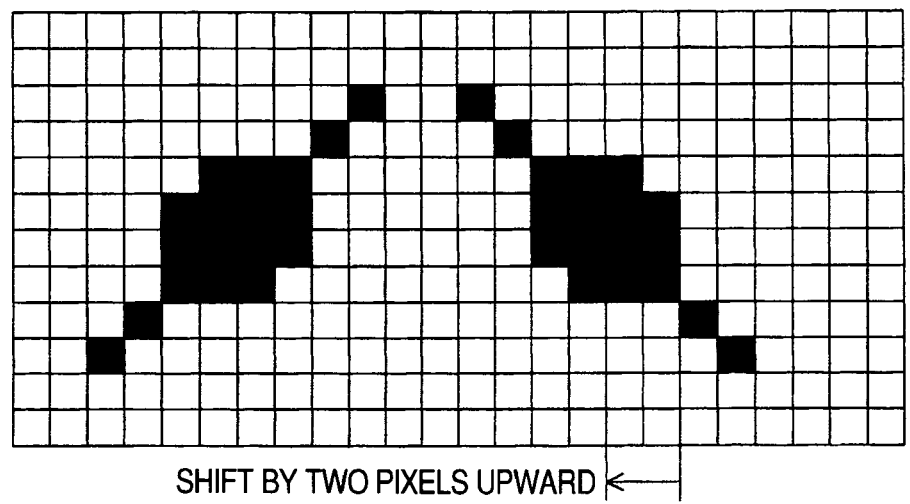
Figure 8A:
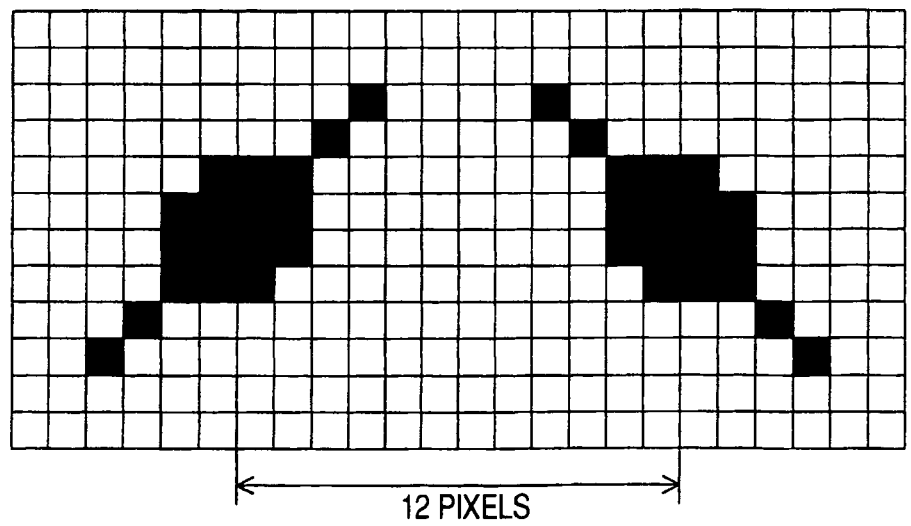

FIGS. 8A to 8C illustrate a method of adjusting the pattern position by the pattern position modulating unit 470. FIG. 8A illustrates a pattern set including adjacent patterns, and FIG. 8B and FIG. 8C show a pattern set in which the distance between the patterns is adjusted by the pattern position modulating unit 470.

The pattern position modulating unit 470 references the bit value of the second bit array from, for example, the upper left in sequence, and shifts the position of, for example, the lower pattern in the pattern set in the pattern image corresponding to the position of the referenced bit either upward or downward by predetermined pixels.

Here, when the bit value of the second code is "1", as shown in FIG. 8B, the lower pattern is shifted upward by two pixels.

When the bit value of the second code is "0", the lower pattern is shifted downward by two pixels as shown in FIG. 8C.

In this manner, the pattern position modulating unit 470 adjusts the positional relation between the patterns being arranged adjacently by the pattern image generating unit 466 and configures a pattern position adjusting device.

Figure 9A:
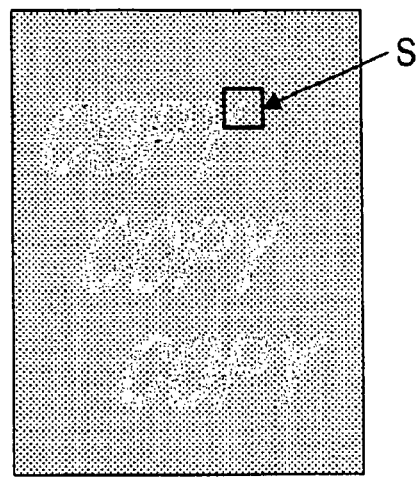
Figure 9B:
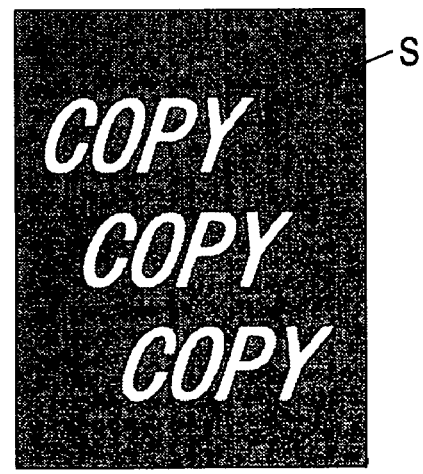
Figure 9C:
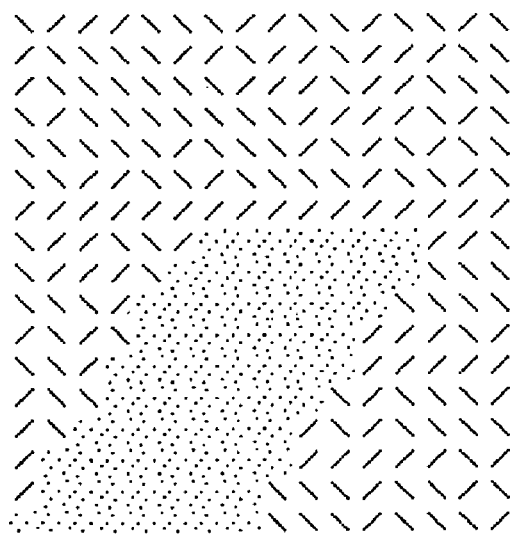

FIGS. 9A to 9C illustrate a printed document on which a background base pattern image generated by the image processing system 2 is printed thereon. FIG. 9A illustrates a printed document on which the background base pattern image is printed, FIG. 9B illustrates a copy of this printed document, and FIG. 9C illustrates a drawing showing the background base pattern image in which an area S in FIG. 9A is enlarged.

As shown in FIG. 9A and FIG. 9B, when the printed document is copied, an area of black pixels in the latent image (area which is represented by characters "COPY" in the drawing) is printed in white, and the latent image appears. The characters "COPY" cannot be viewed by human being, and is viewed only when it is copied.

The background base pattern image includes plural patterns of different shapes arranged on the basis of the first information, and the positional relations between the arranged adjacent patterns are adjusted on the basis of the second information. As shown in FIG. 9C, the printed document is a printed document on which the background base pattern image is printed, and the background base pattern image includes plural patterns of different shapes arranged on the basis of the first information (first code), and the positional relation between the arranged adjacent patterns is adjusted on the basis of the second information (second code). In the printed document in this example, the area of black pixels in the latent image is an isolated dot pattern, and the area of white pixels in the latent image is any one of hatched patterns.

Figure 10:
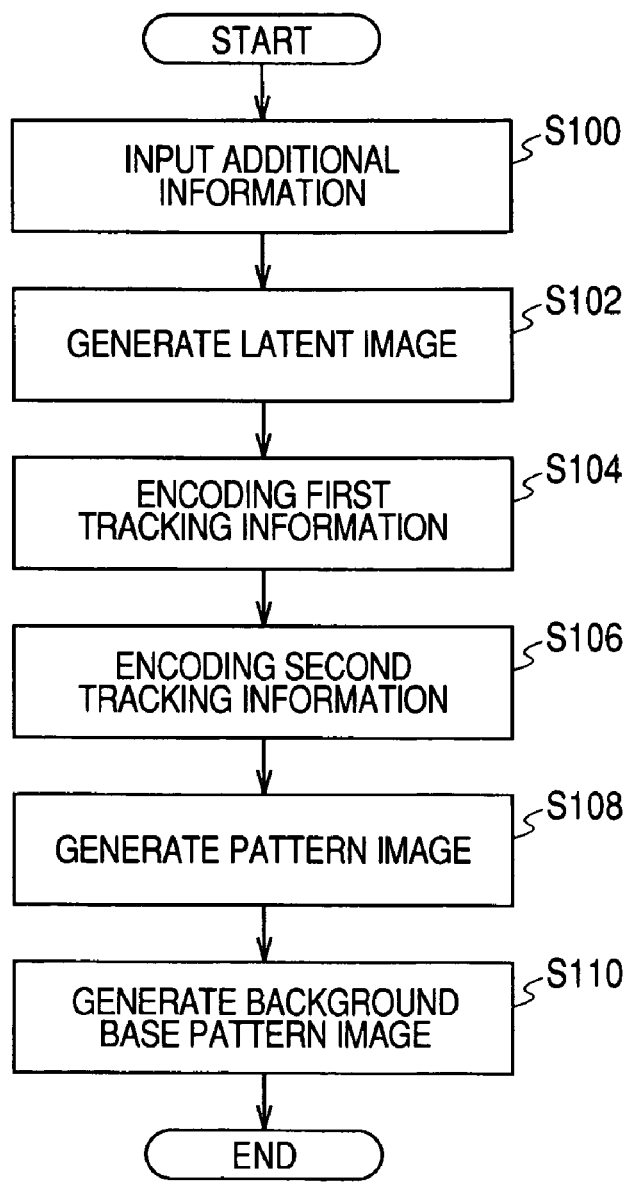
FIG. 10 is a flowchart showing a background base pattern image generating process (S10) according to the image processing program 4.

FIG. 10 is a flowchart showing a background base pattern image generating process (S10) according to the image processing program 4.

As shown in FIG. 10, in Step 100 (S100), the base pattern image generating unit 46 inputs additional information (latent image information, first tracking information, second tracking information) from the controller 40.

In Step 102 (S102), the latent image generating unit 462 of the base pattern image generating unit 46 generates the latent image on the basis of the supplied latent image information.

In Step 104 (S104), the first encoding unit 460 generates first codes on the basis of the supplied first tracking information, arranges the first codes repeatedly and generates the first bit array.

In Step 106 (S106), the second encoding unit 464 generates second codes on the basis of the supplied second tracking information, arranges the second codes repeatedly and generates the second bit array.

In Step 108 (S108), the pattern image generating unit 466 generates a pattern image on the basis of the latent image generated by the latent image generating unit 462, the first bit array generated by the first encoding unit 460, and plural patterns of different shapes stored in the pattern memory 468.

In Step 110 (S110), the pattern position modulating unit 470 adjusts the positional relation between the adjacent patterns in the pattern image generated by the pattern image generating unit 466 on the basis of the second bit array generated by the second encoding unit 464, and generates the background base pattern image. The pattern position modulating unit 470 stores the background base pattern image in the base pattern image buffer 48.

Figure 11:
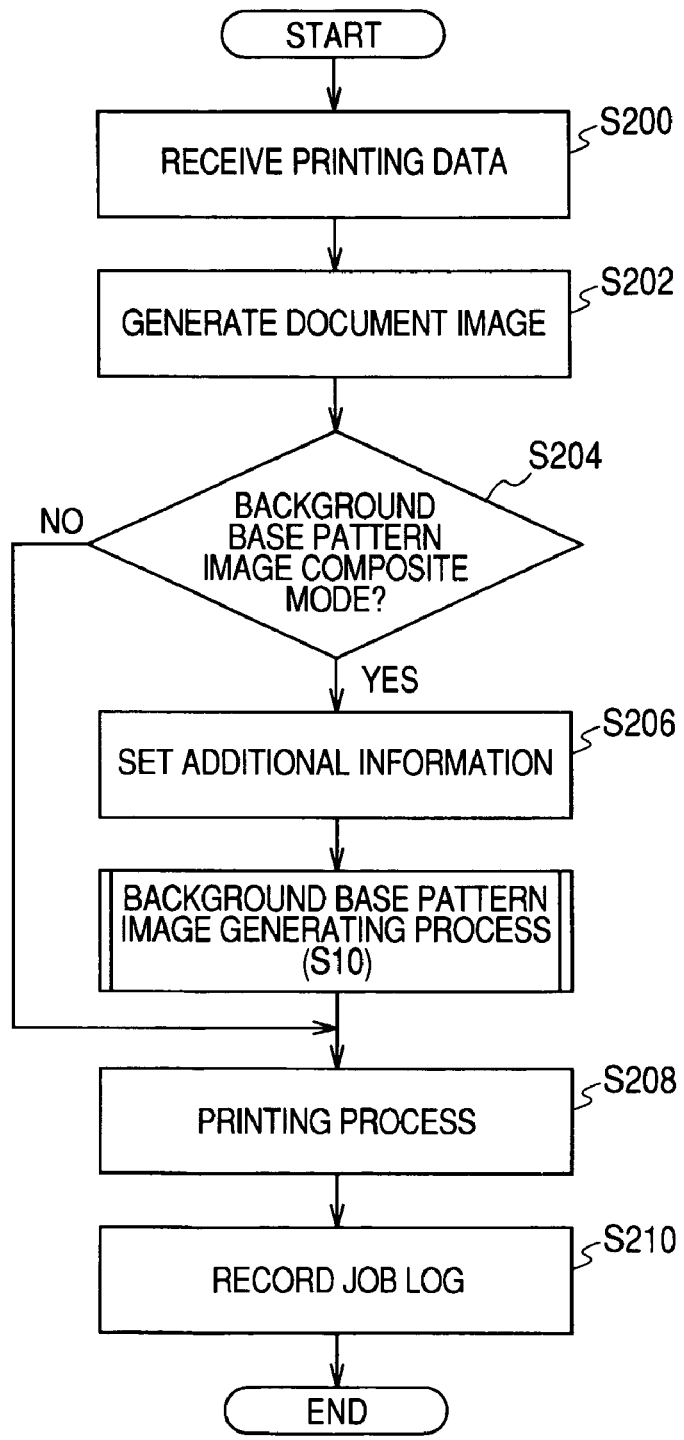
FIG. 11 is a flowchart showing a printing process (S20) performed by the image forming apparatus 10.

FIG. 11 is a flowchart showing a printing process (S20) performed by the image forming apparatus 10 according to an exemplary embodiment of the invention.

As shown in FIG. 11, in Step 200 (S200), the image forming apparatus 10 accepts document data of a PDL form transmitted from the terminal apparatus 5 via the network 3. The controller 40 of the image processing program 4 outputs this document data to the document image generating unit 42.

In Step 202 (S202), the document image generating unit 42 interprets the PDL, and performs a drawing process of the document data to generate the document image data. The document image generating unit 42 stores the generated document image data in the document image buffer 44.

In Step 204 (S204), the controller 40 determines whether the background base pattern image composing mode is set. When the background base pattern image composing mode is set, the controller 40 proceeds to the process in S206, and if not, proceeds to the process in S208.

In Step 206 (S206), the controller 40 outputs additional information including the latent image information, and the first and second tracking information to the base pattern image generating unit 46, and the additional information is set in the base pattern image generating unit 46. Subsequently, the base pattern image generating unit 46 performs the background base pattern image generating process (FIG. 10; S10) and generates the background base pattern image and stores the same in the base pattern image buffer 48.

In Step 208 (S208), when the background base pattern image composing mode is set under the control of the controller 40, the image composing unit 54 reads out the document image and the background base pattern image respectively from the document image buffer 44 and the base pattern image buffer 48 synchronously with the printer unit 12, composes these images, and outputs the same to the printer unit 12. When the background base pattern non-composing mode is set, the image composing unit 54 reads out the document image from the document image buffer 44 synchronously with the printer unit 12, and outputs the same to the printer unit 12.

In Step 210 (S210), the controller 40 relates the first tracking information and the document image data with the job log ID (second tracking information) and records the same as a job log in the memory apparatus 24 such as a memory 204 or a hard disk drive.

Figure 12:
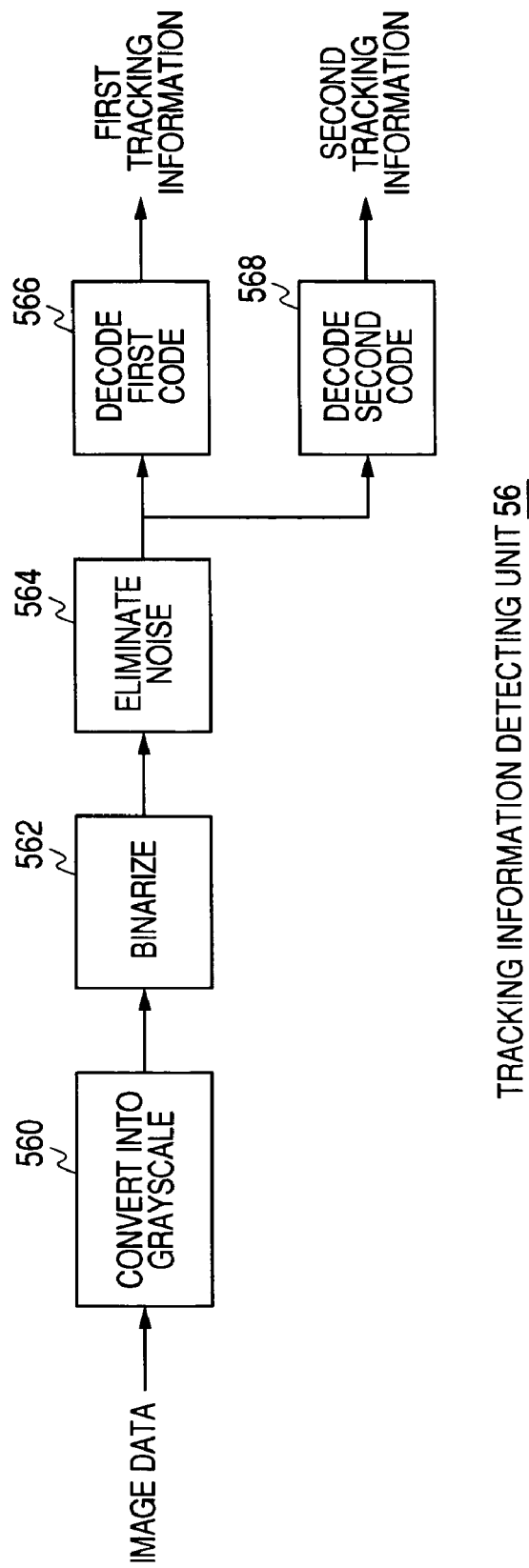
FIG. 12 is a drawing showing a tracking information detecting unit 56 in detail.

FIG. 12 is a drawing showing the tracking information detecting unit 56 in detail.

As shown in FIG. 12, the tracking information detecting unit 56 includes a grayscale converting unit 560, a binarizing unit 562, a noise eliminating unit 564, and a first code decoding unit 566 and a second code decoding unit 568. The tracking information detecting unit 56 detects plural patterns included in the image by these components, and detects information on the basis of the positional relation between the adjacent patterns out of the detected plural patterns.

In the tracking information detecting unit 56, the grayscale converting unit 560 accepts image data (for example, RGB color) read by the scanner unit 14, and converts the image data from full colors to a grayscale. In this manner, the grayscale converting unit 560 configures an accepting device that accepts the read image.

The binarizing unit 562 performs a binarizing process on multilevel image data which is converted into the grayscale by the grayscale converting unit 560 and generates binary image data.

The noise eliminating unit 564 performs a noise eliminating process on the binarized image data by the binarizing unit 562, and the image data from which the noise is eliminated is outputted to the first code decoding unit 566 and the second code decoding unit 568. The noise eliminating unit 564 deletes, for example, the latent image from the image data.

The first code decoding unit 566 detects the first code on the basis of two types of hatched patterns included in the image, decodes the first code, and restores the first tracking information.

The second code decoding unit 568 detects the second code on the basis of distance between two patterns being included in the image and being adjacent in the vertical direction, decodes the second code, and restores the second tracking information.

The first code decoding unit 566 and the second code decoding unit 568 will be described in detail below.

Figure 13:
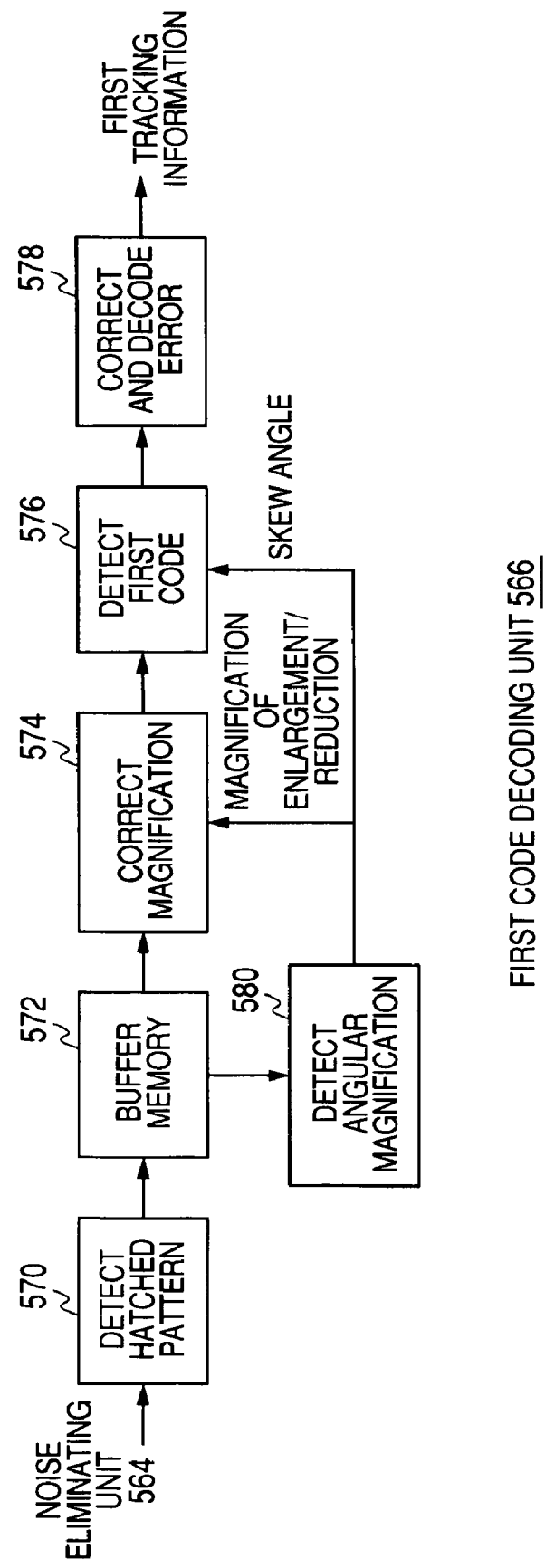
FIG. 13 illustrates a first code decoding unit 566 in detail.

FIG. 13 illustrates the first code decoding unit 566 in detail.

As shown in FIG. 13, the first code decoding unit 566 includes a hatched pattern detecting unit 570, a buffer memory 572, a magnification correcting unit 574, a first code detecting unit 576, an error correcting and decoding unit 578, and an angular magnification detecting unit 580.

In the first code decoding unit 566, the hatched pattern detecting unit 570 detects plural patterns of different shapes included in the accepted read image. More specifically, the hatched pattern detecting unit 570 accepts image data from which noise is eliminated, detects the two types of hatched patterns, and stores the processing result image data into the buffer memory 572. The resultant image data after processing is an image data in which one pixel is represented, for example, by two bits, and the pixel value at a position where a hatched pattern corresponding to bit "0" is detected is "0", the pixel value at a position where a hatched pattern corresponding to bit "1" is detected is "1", and the pixel value corresponding to other positions is "2".

The buffer memory 572 stores resultant image data detected by the hatched pattern detecting unit 570.

The angle magnification detecting unit 580 reads out image data stored in the buffer memory 572 at a predetermined timing, and calculates a skew angle and a magnification of enlargement/reduction of the image data. More specifically, the angular magnification detecting unit 580 performs a Hough conversion on pixels which are represented only by the pixel values "0" and "1", and obtains a peak of a projection distribution on the angular θ axis to obtain a skew angle. The angular magnification detecting unit 580 outputs the calculated skew angle to the first code detecting unit 576. The angular magnification detecting unit 580 applies the Hough conversion, determines a magnification on the basis of positional relation between adjacent patterns, and outputs the magnification to the magnification correcting unit 574. The Hough conversion performed by the angular magnification detecting unit 580 will be described in detail later.

The magnification correcting unit 574 reads out the image data stored in the buffer memory 572 at a predetermined timing, and performs an image enlargement/reduction process with respect to the image at a magnification of enlargement/reduction obtained by the angular magnification detecting unit 580. The magnification correcting unit 574 performs the image enlargement/reduction process using a system in which the pixel value does not change (for example, a nearest neighbor method). The magnification correcting unit 574 outputs the image data whose magnification is corrected to the first code detecting unit 576.

The first code detecting unit 576 detects the first information (first code) on the basis of the array of plural patterns detected by the hatched pattern detecting unit 570. More specifically, the first code detecting unit 576 scans the image whose magnification is corrected by the magnification correcting unit 574 along the skew angle obtained by the angle magnification detecting unit 580, and acquires the pixel value which corresponds to any one of bit "0" and bit "1".

The first code detecting unit 576 detects a synchronous code from the acquired bit array. The synchronous code here is generated by the first encoding unit 460, and for example, the respective bits along the outer periphery of the square area having predetermined dimensions in the vertical and lateral directions are "1" (see FIG. 6A). The first code detecting unit 576 detects the two-dimensional code which corresponds to a bit array surrounded by synchronous codes on the basis of the detected synchronous code, rearranges the two-dimensional code into a one-dimensional bit array, and outputs the same to the error correcting and decoding unit 578.

The first code detecting unit 576 may read out image data stored in the buffer memory 572 at a predetermined timing, accept a magnification of enlargement/reduction obtained by the angular magnification detecting unit 580, and scan the image at the accepted magnification of enlargement/reduction along the obtained skew angle. In this case, a magnification correcting process is not applied to the image, and the pixel value which corresponds to any one of bit "0" and bit "1" is acquired, and the synchronous code is detected from this bit array.

The error correcting and decoding unit 578 performs a predetermined error correcting and decoding process with respect to the bit array supplied from the first code detecting unit 576 to decode the first tracking information. The error correcting and decoding unit 578 outputs the decoded first tracking information to the controller 40 (FIG. 4).

Characteristics of the Hough conversion performed by the angular magnification detecting unit 580 will be described.

The Hough conversion is a conversion shown by the following expression.

$$\rho = x \cdot \cos\theta + y \cdot \sin\theta \quad (1)$$

where θ represents an angle and ρ represents a distance.

When the Hough conversion is applied on a point (x, y) on an image, a single sine waveform appears on a space after conversion (Hough space). When the Hough conversion is applied to a linearly arranged array of points, plural sine waves corresponding to the respective points are gathered at one point in the Hough space, and the value of the point is maximized. When the Hough conversion is applied to a group of points arranged in gridiron, plural groups of sine waves which are gathered to one point are arranged in parallel in the Hough space. In this case, all the sign waves in the group are gathered to one point at the same angle θ. The angle θ corresponds to the angle of inclination of the grid on the image. The interval between gathered points of the respective sine wave groups corresponds to the intervals of grids of the group of points in gridiron. Therefore, the skew angle and the interval (cycle) of the group of points can be obtained by obtaining the angle θ of the sine waves gathered to one point and the interval between the gathered points.

Figure 14A:
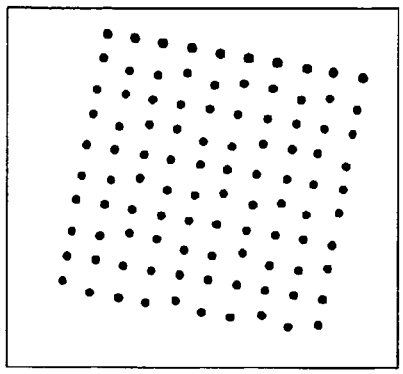
Figure 14B:
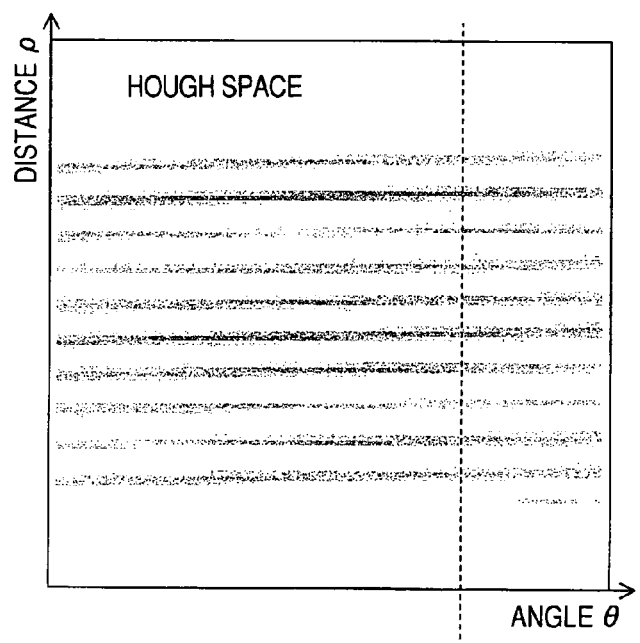
Figure 14D:
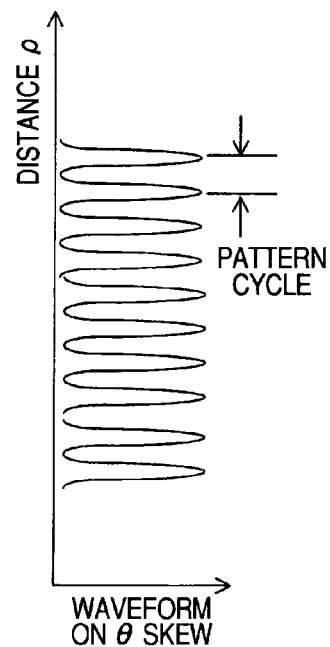
Figure 14C:
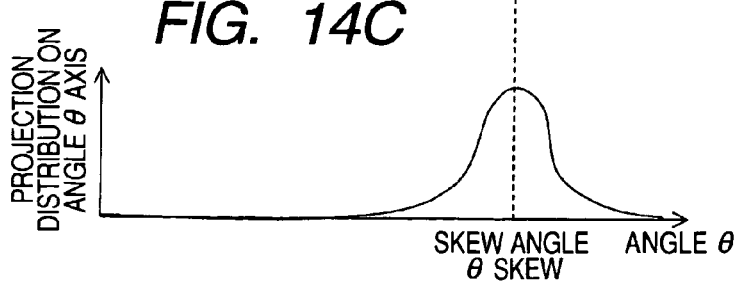

FIGS. 14A to 14D illustrate the Hough conversion performed by the angular magnification detecting unit 580. FIG. 14A illustrates image data (pattern data) stored in the buffer memory 572, FIG. 14B illustrates the Hough space after the Hough conversion is applied on all the patterns, FIG. 14C illustrates a projection distribution on the angle θ axis, and FIG. 14D illustrates a waveform in the direction of the distance ρ on the angle θ skew.

As shown in FIG. 14A, plural pattern pixels (pixels whose pixel values are any one of "0" and "1") are included in image data stored in the buffer memory 572. The angular magnification detecting unit 580 reads image data from the buffer memory 572, operates from an origin in sequence to detect the pattern pixels, and performs the Hough conversion on the basis of all the coordinates of the detected pattern pixels.

As shown in FIG. 14B, after the Hough conversion for all the patterns are ended, the angular magnification detecting unit 580 obtains the maximum values of the respective elements on the Hough space. The angular magnification detecting unit 580 obtains the projection distribution on the θ-axis for the respective elements on the Hough space. The angular magnification detecting unit 580 employs a half the maximum value as a threshold value and determines elements not exceeding the threshold value as zero for projection. Consequently, as shown in FIG. 14C, the projection distribution on the θ-axis assumes a distribution which shows a maximum value at a certain angle θ. The angular magnification detecting unit 580 employs the angle θ which shows the maximum projection distribution as the skew angle θskew. The angle magnification detecting unit 580 outputs the detected skew angle to the first code detecting unit 576.

As shown in FIG. 14D, the waveform on the angle θskew in the direction of distance ρ has a certain cycle. When employing an average of the peak-to-peak intervals as a cycle, this cycle corresponds to the cycle (that is, intervals) of the pattern rows on the image (on an actual space). The angular magnification detecting unit 580 compares the obtained cycle and a preset cycle (a pattern size generated by the base pattern image generating unit 46), and a magnification of enlargement/reduction which will be resulted when the read original document is copied in enlarged or reduced scale is obtained from the ratio.

For example, when the pattern size employed when the base pattern image generating unit 46 generates the image is 12 pixels×12 pixels, the preset cycle is 12 pixels. Assuming that the cycle obtained through the Hough conversion is 16.9 pixels, from the expression;

$$16.9 \div 12 = 1.41,$$

it is found that the magnification of enlargement/reduction is 141%. The angular magnification detecting unit 580 outputs the magnification of enlargement/reduction obtained in this manner to the magnification correcting unit 574.

Figure 15:
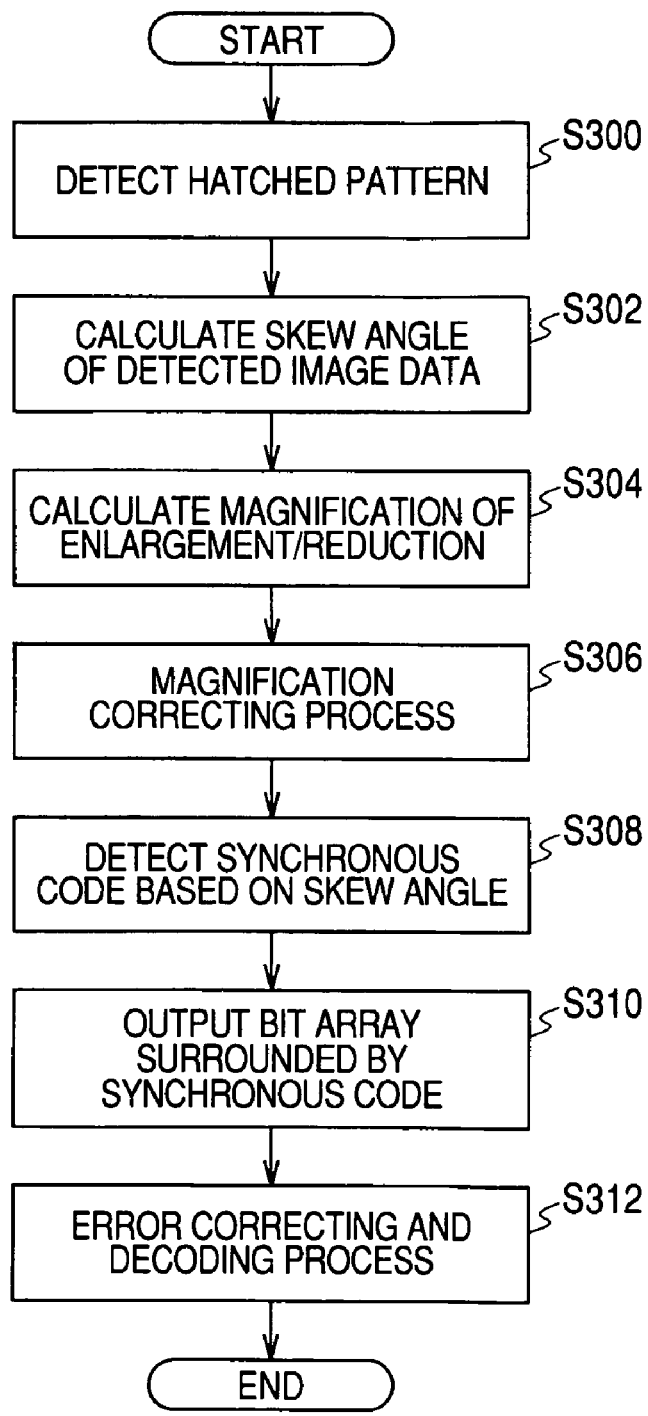
FIG. 15 is a flowchart showing a first tracking information decoding process (S30) by the first code decoding unit 566.

FIG. 15 is a flowchart showing a first tracking information decoding process (S30) by the first code decoding unit 566.

As shown in FIG. 15, the image data from which the noise is eliminated in Step 300 (S300) is supplied to the hatched pattern detecting unit 570 and two types of hatched patterns are detected. The image data obtained as a result of the process is stored in the buffer memory 572 by the hatched pattern detecting unit 570.

In Step 302 (S302), the image data stored in the buffer memory 572 is read out to the angular magnification detecting unit 580, and the skew angle of the image data is calculated by the angular magnification detecting unit 580. The angular magnification detecting unit 580 performs the Hough conversion on any one of the pixel having the pixel value "0" and the pixel having the pixel value "1" to calculate the skew angle.

In Step 304 (S304), the magnification of enlargement/reduction can be calculated by the angular magnification detecting unit 580. The angular magnification detecting unit 580 calculates the pattern cycle by applying the Hough conversion, and the magnification of enlargement/reduction is obtained from the ratio between the calculated cycle and the preset cycle.

In Step 306 (S306), the image data stored in the buffer memory 572 is read out to the magnification correcting unit 574, and the magnification correcting unit 574 performs the magnification correcting process on the basis of the calculated magnification of enlargement/reduction.

In Step 308 (S308), the first code detecting unit 576 scans the image which is corrected in magnification along the calculated skew angle to acquire the pixel value corresponding to any one of bit "0" and bit "1", and a synchronous code is detected from the acquired bit array.

In Step 310 (S310), the two-dimensional code is detected by the first code detecting unit 576 on the basis of the detected synchronous code, is rearranged into a one-dimensional bit array, and is outputted to the error correcting and decoding unit 578.

In Step 312 (S312), in the error correcting and decoding unit 578, a predetermined error correcting and decoding process is performed on the bit array supplied from the first code detecting unit 576 and the first tracking information is decoded.

Figure 16:
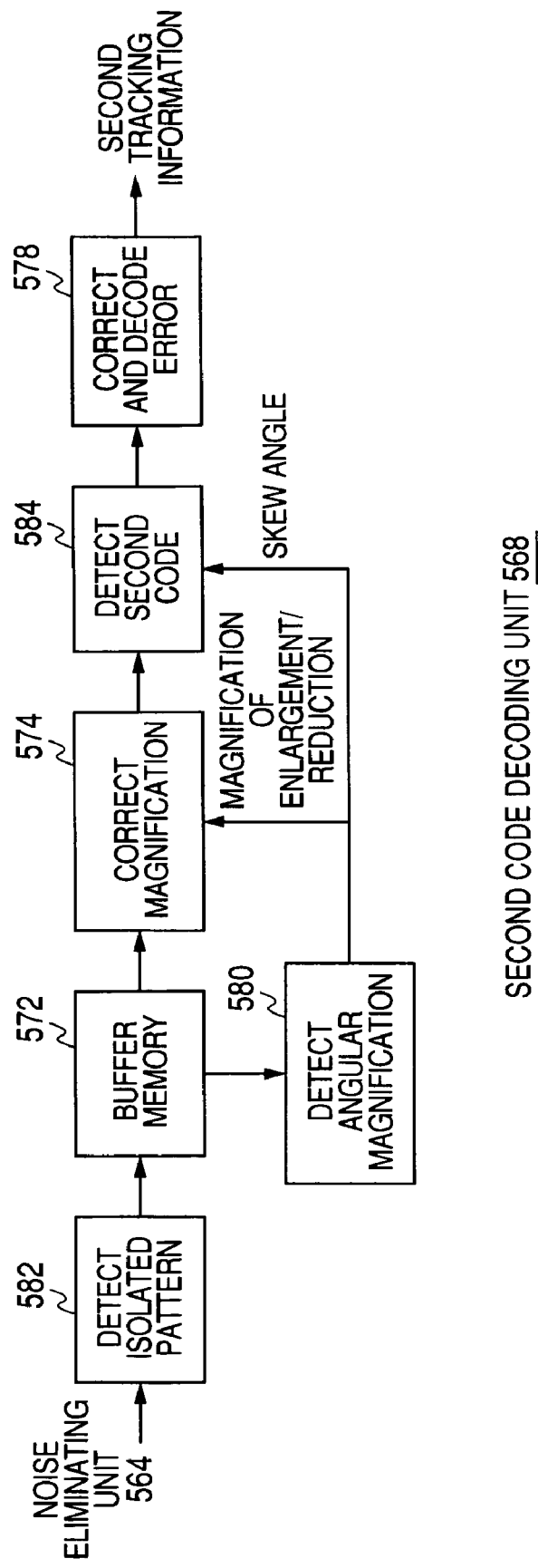
FIG. 16 illustrates a second code decoding unit 568 in detail.

FIG. 16 illustrates the second code decoding unit 568 in detail.

As shown in FIG. 16, the second code decoding unit 568 includes an isolated pattern detecting unit 582, the buffer memory 572, the angular magnification detecting unit 580, the magnification correcting unit 574, a second code detecting unit 584, and an error correcting and decoding unit 578. In FIG. 16, the substantially same parts as those in FIG. 13 are represented by the same reference numerals.

In the second code decoding unit 568, the isolated pattern detecting unit 582 detects plural patterns included in the image. More specifically, the isolated pattern detecting unit 582 accepts an image data from which the noise is eliminated, detects the isolated pattern smaller than the predetermined surface area, generates the pattern center image data which includes a center coordinate of the isolated pattern, and stores the pattern center image data in the buffer memory 572. Here, the pattern center image data is an image data representing one pixel by one bit, for example, and the pixel value of a position which is detected as the center position of the isolated pattern is represented by "1", and the pixel values of other positions are represented by "0". The shape of the pattern included in the image is not detected by the isolated pattern detecting unit 582.

The second code detecting unit 584 detects the second information (second code) on the basis of the positional relation between the adjacent patterns out of plural patterns which are detected by the isolated pattern detecting unit 582 and are corrected in magnification by the magnification correcting unit 574. More specifically, the second code detecting unit 584 accepts the pattern center image data on which the magnification correcting process is applied, calculates the positional relation between the adjacent patterns on the basis of the skew angle obtained by the angular magnification detecting unit 580, and detects the embedded bit value on the basis of the calculated distance.

When the pattern center image data whose magnification is corrected is supplied, the second code detecting unit 584 searches a pixel which is at a position closest to the origin in the data and whose pixel value is "1" (that is, the center of the isolated pattern), and the searched pixel is determined as a start point. The second code detecting unit 584 searches a center point of the pattern existing in the predetermined range in the direction orthogonal to the skew angle from the start point, and obtains the distance between the start point and the searched center point of the pattern. The second code detecting unit 584 detects bit "1" when the distance is smaller than the predetermined interval (for example, 12 pixels), and detects bit "0" when the distance is larger than the predetermined interval.

The second code detecting unit 584 detects one row of a position modulated bit array by performing the same detection process in the direction of the skew angle at predetermined intervals. When the detection process of the position modulated bit array for one row is ended, the second code detecting unit 584 returns back to the start point, and searches the center of the isolated pattern at positions double the predetermined intervals (for example, 24 pixels) in the direction orthogonal to the skew angle. The second code detecting unit 584 obtains a second position modulated bit array with the searched position as a new start point in the same manner. The second code detecting unit 584 detects the bit arrays for one image by repeating the same process to the lower end of the image.

The second code detecting unit 584 detects the synchronous code from the detected bit array. Here, the synchronous code is generated by the second encoding unit 464, and for example, the respective bits along the outer periphery of the square area having predetermined sizes in vertical and lateral sides are "1" (FIG. 6B). The second code detecting unit 584 detects the two-dimensional code which is a bit array surrounded by synchronous codes on the basis of the detected synchronous codes, and rearranges the two-dimensional code into a one-dimensional bit array, and outputs the same to the error correcting and decoding unit 578.

The error correcting and decoding unit 578 performs a predetermined error correcting and decoding process on the bit array supplied from the second code detecting unit 584, and decodes the second tracking information. The error correcting and decoding unit 578 outputs the decoded second tracking information to the controller 40 (FIG. 4).

Figure 17:
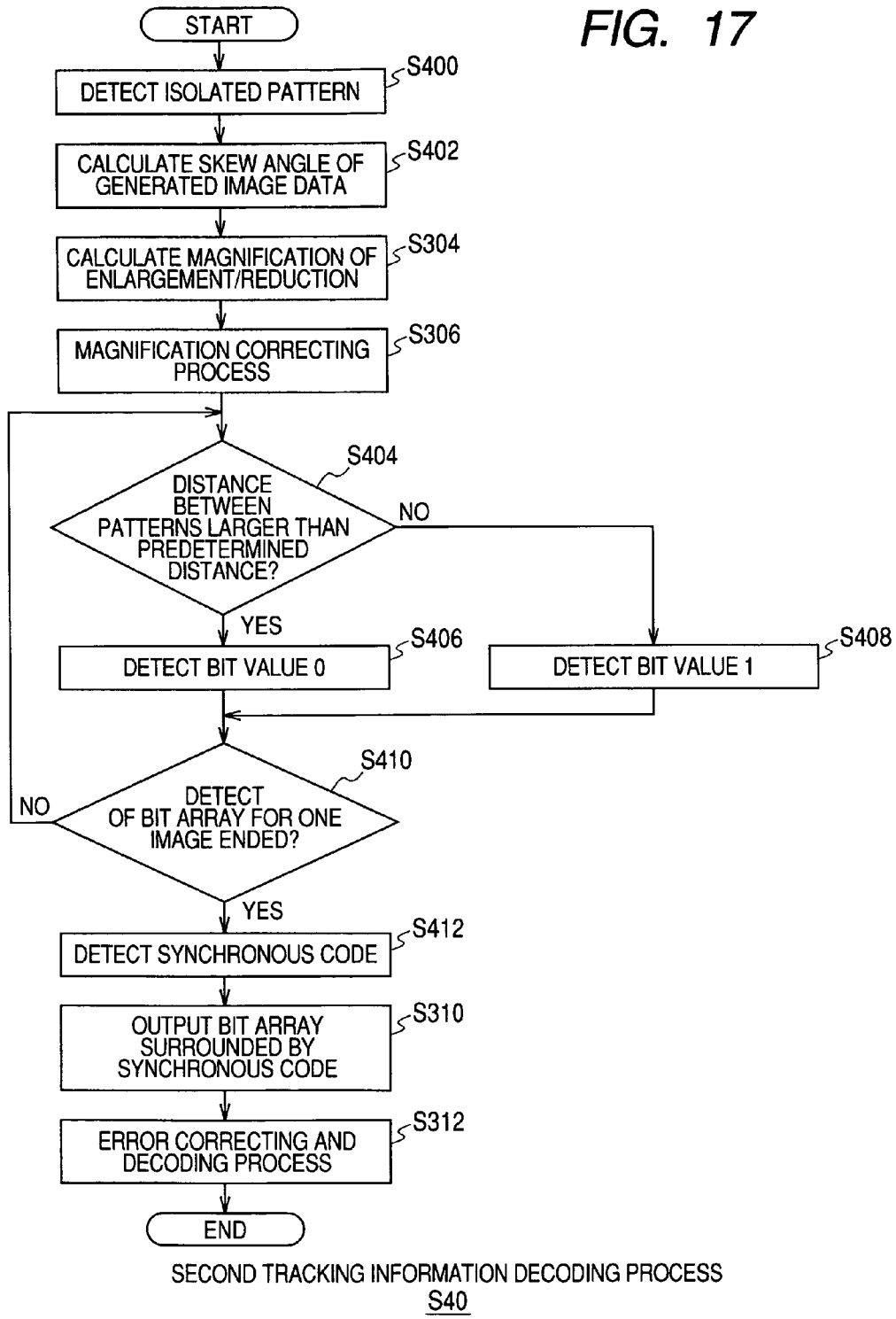
FIG. 17 is a flowchart showing a second tracking information decoding process (S40) by the second code decoding unit 568.

FIG. 17 is a flowchart showing a second tracking information decoding process (S40) by the second code decoding unit 568. In FIG. 17, the substantially same processes as those shown in FIG. 15 are represented by the same reference numerals.

As shown in FIG. 17, in Step 400 (S400), the image data from which the noise is eliminated is supplied to the isolated pattern detecting unit 582, where the isolated pattern is detected, and the pattern center image data is generated. The pattern center image data is stored in the buffer memory 572 by the isolated pattern detecting unit 582.

In Step 402 (S402), the pattern center image data stored in the buffer memory 572 is read out by the angular magnification detecting unit 580, and the skew angle of the image data is calculated by the angular magnification detecting unit 580. More specifically, the angular magnification detecting unit 580 performs the Hough conversion on any one of the pixel having the pixel value "0" and the pixel having the pixel value "1" to calculate the skew angle.

The magnification of enlargement/reduction is calculated by the angular magnification detecting unit 580 in S304. Then, the magnification correcting process is performed in the process in S306.

In Step 404 (S404), the image whose magnification is corrected is supplied to the second code detecting unit 584. The second code detecting unit 584 obtains the distance between the start point and the searched center point of the pattern and determines whether the distance is larger than the predetermined interval or not as described above. When the distance is larger than the predetermined interval, the second code detecting unit 584 proceeds to a process in S406, and if not, proceeds to a process in S408.

In Step 406 (S406), the second code detecting unit 584 detects bit "0" on the basis of the positional relation.

In Step 408 (S408), the second code detecting unit 584 detects bit "1" on the basis of the positional relation.

In Step 410 (S410), the second code detecting unit 584 determines whether or not the bit arrays for one full image are detected. When the bit arrays for one full image are detected, the second code detecting unit 584 proceeds a process in S412, and if not, returns back to the process in S404.

In Step 412 (S412), when the synchronous code is detected from the detected bit array. Subsequently, in the process in S310, the two-dimensional code is detected by the second code detecting unit 584 on the basis of the synchronous code, and is rearranged to the one-dimensional bit array, and is outputted to the error correcting and decoding unit 578. Furthermore, in the process in S312, in the error correcting and decoding unit 578, the error correcting and decoding process is performed for the inputted bit array and the second tracking information is decoded.

Figure 18:
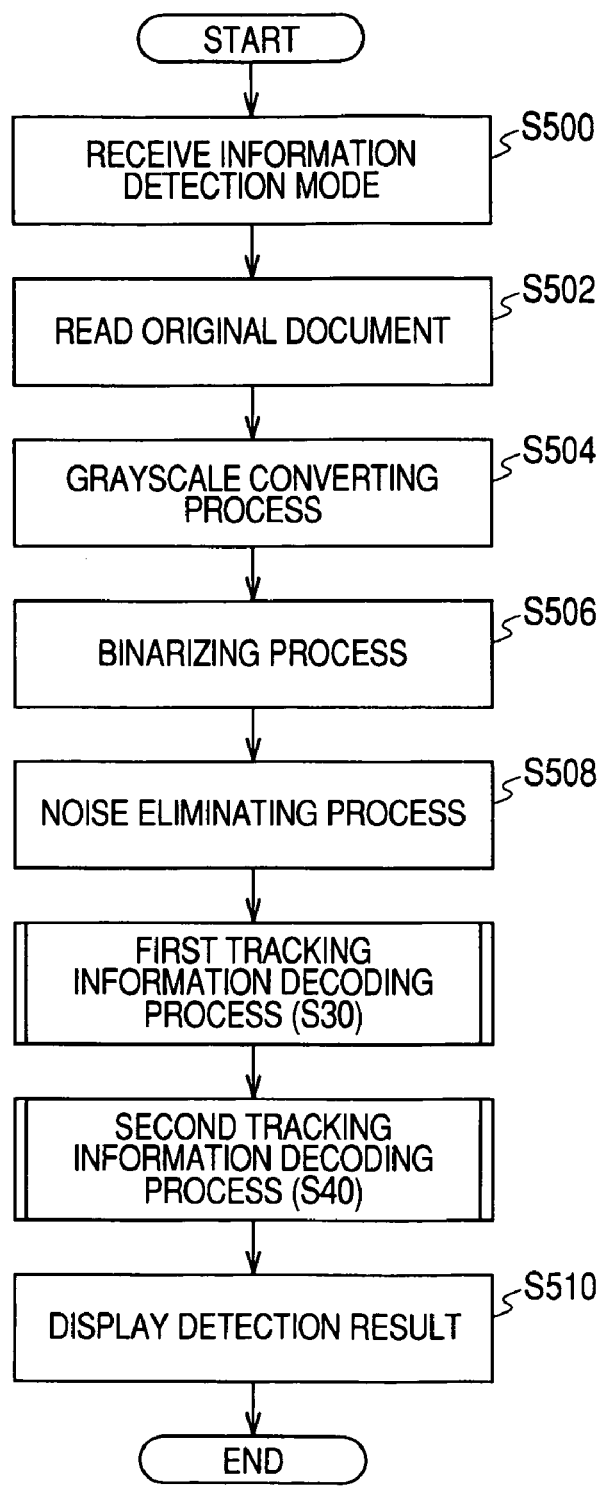
FIG. 18 is a flowchart showing a tracking information detection process (S50) by the image processing system 2 according to an exemplary embodiment of the invention.

FIG. 18 is a flowchart showing a tracking information detection process (S50) by the image processing system 2 according to an exemplary embodiment of the invention.

As shown in FIG. 18, in Step 500 (S500), the controller 40 of the image processing program 4 (FIG. 4) accepts an operation by the user to set an information detection mode for detecting the tracking information via the UI apparatus 26 (FIG. 3). The setting may be done in advance.

In Step 502 (S502), when the user presses a copy button with an original document on the platen of the scanner unit 14, the scanner unit 14 reads the original document. The scanner unit 14 outputs the read image to the tracking information detecting unit 56 in the image processing program 4.

In Step 504 (S504), a grayscale converting unit 560 in the tracking information detecting unit 56 (FIG. 15) performs a grayscale converting process on the read image data.

In Step 506 (S506), the binarizing unit 562 performs the binarizing process on the multilevel image data to which the grayscale converting process is applied.

In Step 508 (S508), the noise eliminating unit 564 applies a noise eliminating process on the binary image data to which the binarizing process is applied.

The image data after the noise is eliminated is outputted to the first code decoding unit 566, and the first code decoding unit 566 performs the first tracking information decoding process (FIG. 15, S30) to decode the first tracking information, and outputs the first tracking information to the controller 40.

The image data after the noise is eliminated is outputted to the second code decoding unit 568, and the second code decoding unit 568 performs the second tracking information decoding process (FIG. 17, S40) to decode the second tracking information, and then the second tracking information is outputted to the controller 40.

When the tracking information is not detected from the image, this event is outputted to the controller 40.

In Step 510 (S510), the controller 40 displays the supplied result of detection of information on the UI apparatus 26. The controller 40 extracts the job log ID from the detected tracking information. When the extracted job log ID exists in the job log data in the image forming apparatus 10, the controller 40 displays the document image data or the thumbnail thereof which is allocated to the data or the job log ID on the UI apparatus 26.

As described thus far, the image processing system 2 according to an exemplary embodiment of the invention includes a pattern detecting device that detects plural patterns included in a read image, and a magnification determining device that determines magnification on the basis of positional relation between adjacent patterns out of the plural patterns detected by the pattern detecting device, and an information detecting device that detects information from the read image on the basis of the magnification determined by the magnification determining device. Accordingly, the image processing system 2 can detect embedded information from a copy of the original document effectively even when the document in which the information is embedded is copied in an enlarged scale or a reduced scale.

Subsequently, the image processing system 2 according to a second exemplary embodiment of the invention will be described.

The image processing system 2 according to this exemplary embodiment is different from the image processing system 2 according to the first exemplary embodiment in that distance and direction (angle) between adjacent patterns are obtained and, on the basis of respective average values thereof, a pattern interval and a skew angle are obtained to calculate magnification of enlargement/reduction. The image processing system 2 according to this exemplary embodiment corrects the magnification by applying the enlargement/reduction process on the image data on the basis of the calculated magnification of enlargement/reduction, and performs the pattern detection process again for the image after the magnification is corrected.

The image processing system 2 according to this exemplary embodiment splits the image into blocks, obtains distance and direction (angle) between adjacent patterns for respective patterns in the blocks, and corrects magnification of the image data by block from average distance and average angle in the blocks. Accordingly, for example, when distortion occurs in a center portion and a peripheral portion of the image (when the magnification and inclination are different between the center portion and the peripheral portion), the image processing system 2 may detect correct information.

Figure 19:
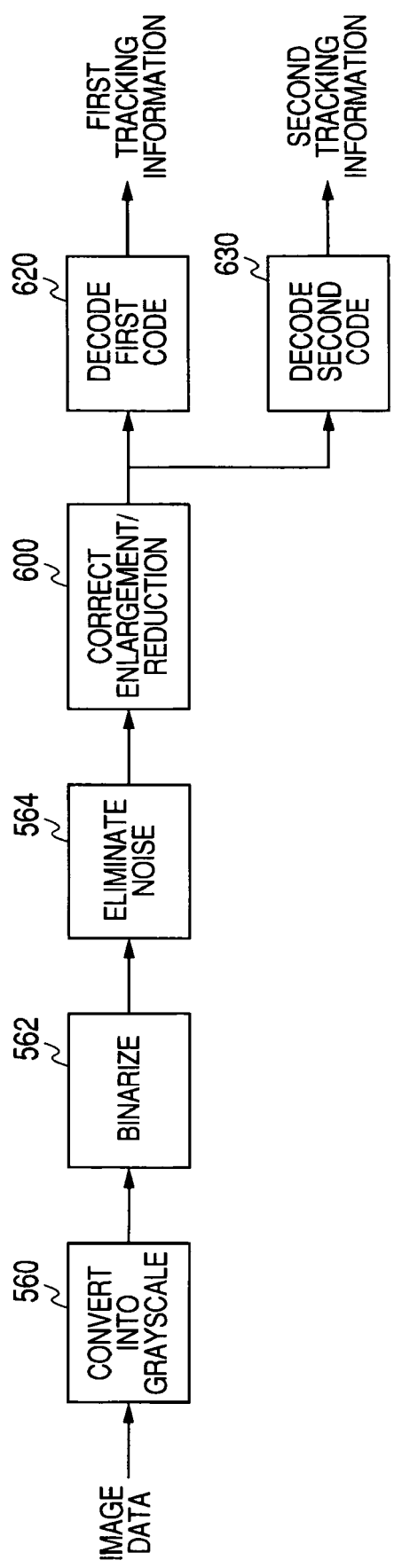
FIG. 19 illustrates a tracking information detecting unit 60 in detail.

FIG. 19 illustrates a tracking information detecting unit 60 in detail.

As shown in FIG. 19, the tracking information detecting unit 60 includes the grayscale converting unit 560, the binarizing unit 562, the noise eliminating unit 564, an enlargement/reduction correcting unit 600, a first code decoding unit 620, and a second code decoding unit 630. In FIG. 19, the substantially same parts as those shown in FIG. 12 are represented by the same reference numerals.

The enlargement/reduction correcting unit 600 accepts an image data after the noise is eliminated, detects the magnification of enlargement/reduction, and performs either enlargement or reduction of the image on the basis of the magnification of enlargement/reduction.

The first code decoding unit 620 detects the first code on the basis of the two hatched pattern contained in the enlarged or reduced image, and decodes the first code to restore the first tracking information.

The second code decoding unit 630 detects the second code on the basis of the distance of the two patterns being included in the enlarged or reduced image and being adjacent in the vertical direction in the set, and decodes the second code to restore the second tracking information.

Hereinafter, the enlargement/reduction correcting unit 600, the first code decoding unit 620, and the second code decoding unit 630 will be described.

Figure 20:
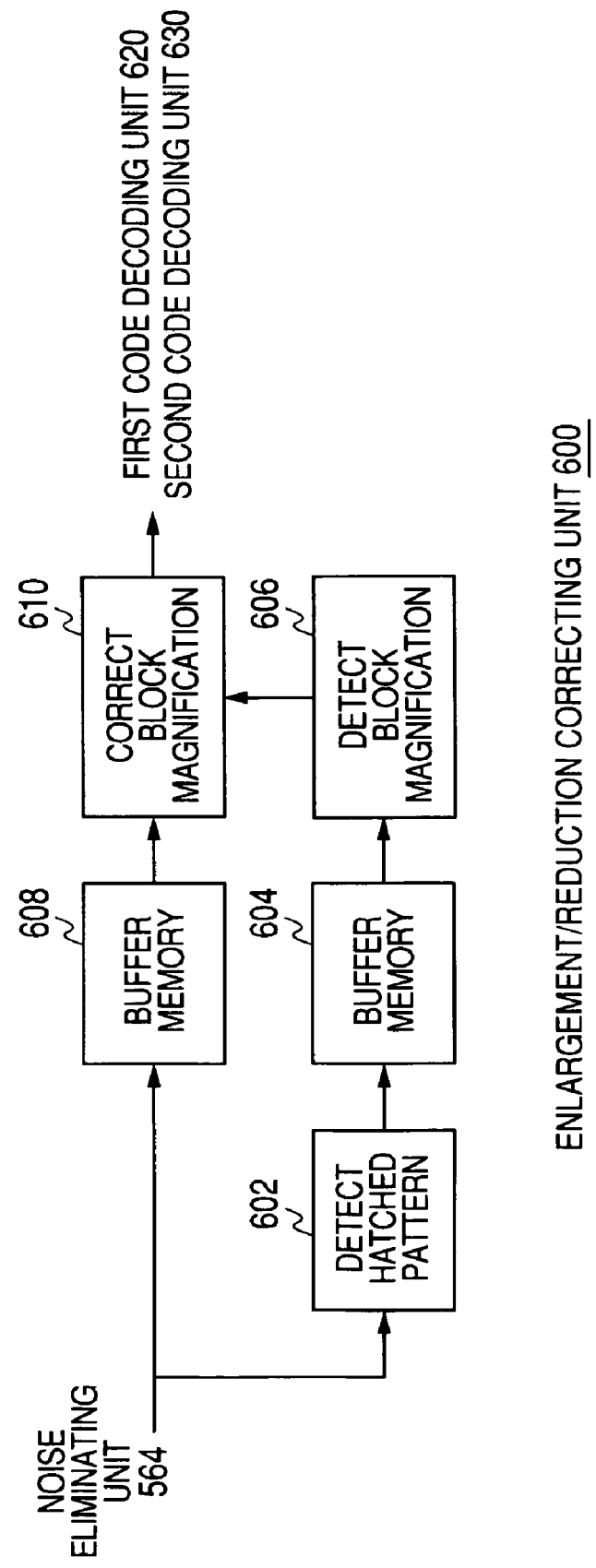
FIG. 20 illustrates an enlargement/reduction correcting unit 600 in detail.

FIG. 20 illustrates the enlargement/reduction correcting unit 600 in detail.

As shown in FIG. 20, the enlargement/reduction correcting unit 600 includes a hatched pattern detecting unit 602, a buffer memory 604, a block magnification detecting unit 606, a buffer memory 608, and a block magnification correcting unit 610.

In the enlargement/reduction correcting unit 600, the hatched pattern detecting unit 602 accepts the image data after the noise is eliminated, detects two types of hatched patterns, and stores the resultant image data after processing in the buffer memory 604. The hatched pattern detecting unit 602 detects the pattern similar to this hatched pattern in addition to the hatched pattern (FIG. 7A, FIG. 7B). For example, the hatched pattern detecting unit 602 detects the hatched pattern of 50% to 200% of the predetermined pattern size.

The buffer memory 604 stores the resultant image data detected by the hatched pattern detecting unit 570.

The block magnification detecting unit 606 reads out the image data stored in the buffer memory 604 by block and obtains the magnification of enlargement/reduction for the respective blocks. The block magnification detecting unit 606 detects the distance between the adjacent patterns and determines the magnification of enlargement/reduction on the basis of the average distance and the preset distance.

A method of calculating the magnification by the block magnification detecting unit 606 will be described in detail later. The block magnification detecting unit 606 may obtain the magnification of enlargement/reduction using the Hough conversion.

The buffer memory 608 stores the image data after the noise is eliminated.

The block magnification correcting unit 610 reads out image data stored in the buffer memory 608 and performs the magnification correcting process by block. The block magnification correcting unit 610 performs the image enlargement/reduction process using a known image enlargement/reducing system (for example, a nearest neighbor method) for the binary image. Accordingly, the deformation of the magnification over the entire image is corrected. The block magnification correcting unit 610 outputs the image data whose magnification is corrected to the first code decoding unit 620 and the second code decoding unit 630.

Subsequently, a method of calculating the magnification by the block magnification detecting unit 606 will be described.

The block magnification detecting unit 606 firstly reads out the pattern data corresponding to a block at an upper left position of the image from the buffer memory 604. The block magnification detecting unit 606 determines a pattern in the vicinity of the origin (for example, the upper left) in the block as a base point and, from this position, searches a pattern at a position closest thereto existing in a predetermined range, and obtains the distance and the direction (for example, the angle with respect to the X-coordinate) to the pattern. Then, the block magnification detecting unit 606 searches the remaining pattern within a range of predetermined angle in the direction of 90 degrees, 180 degrees, and 270 degrees with respect to this direction and obtains the respective distances. In this manner, the block magnification detecting unit 606 obtains the distances to the patterns being adjacent in the four directions, and obtains the distance distribution for the respective patterns.

Figure 21:
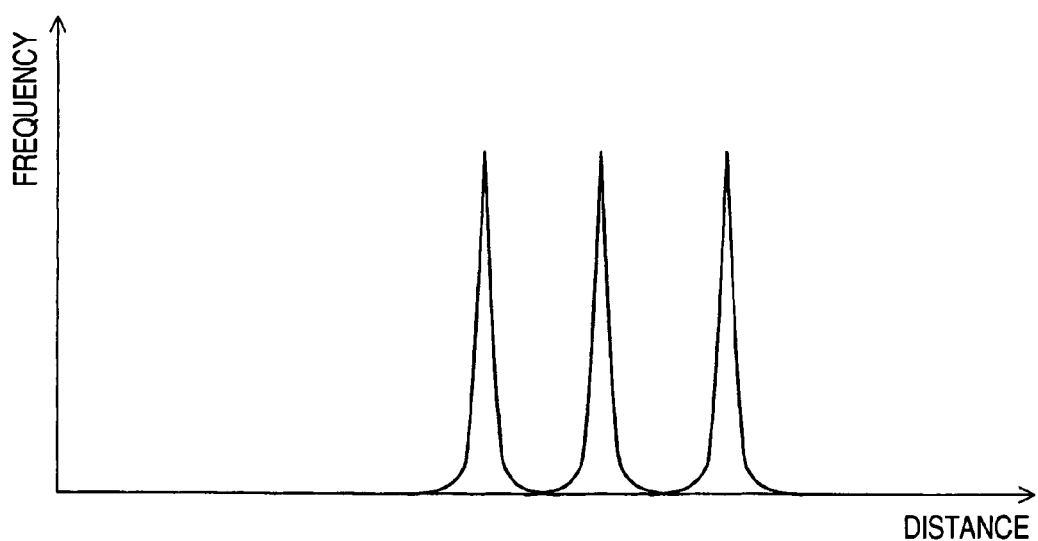
FIG. 21 illustrates a distance distribution obtained by a block magnification detecting unit 606.

FIG. 21 illustrates a distance distribution obtained by the block magnification detecting unit 606.

As shown in FIG. 21, the distance distribution has tree peaks. The patterns embedded in the image are arranged at equal intervals in the lateral direction (for example, 12 pixels), and grouped into pairs in the vertical direction and the distance of the patterns in the pair is reduced by shifting by two pixels toward each other (indicates bit "1") or is increased by shifting by two pixels from each other (indicates bit "0"). Therefore, three peaks appear in the distance distribution. In other words, when the read document is an original document (not an enlarged/reduced copy), the distance from the pattern to the patterns being adjacent in four directions are any one of 10 pixels, 12 pixels and 14 pixels. Therefore, the distance distribution of the patterns included in one block has peaks at three points of 10 pixels, 12 pixels and 14 pixels.

Here, a case in which the read original document is a copy of the original document enlarged by 200% is considered. In this case, the interval between the respective patterns is 24 pixels (12 pixels×2) in the lateral direction and 20 pixels or 28 pixels in the vertical direction, and the distance distribution includes peaks at three points. The block magnification detecting unit 606 obtains three peaks from the distance distribution in the block, obtains ratios between the distances of the respective peaks and the corresponding predetermined distances (10 pixels, 12 pixels, 14 pixels), and determines the average value as the magnification of enlargement/reduction.

Figure 22:
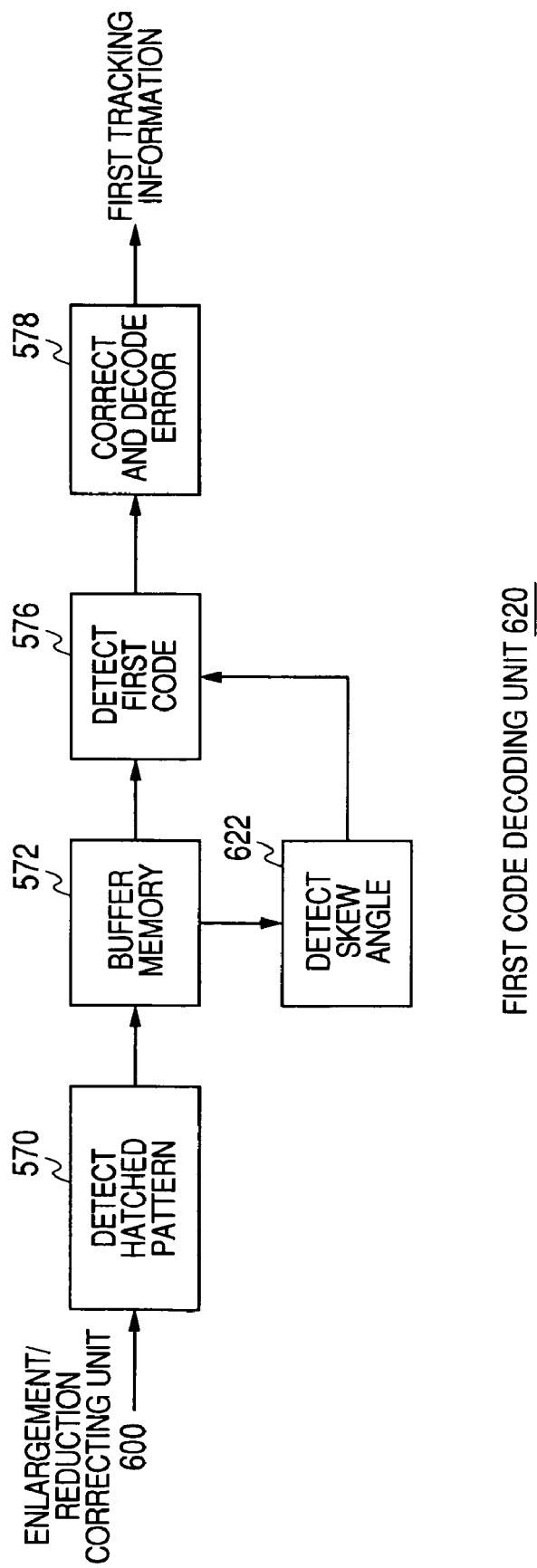
FIG. 22 illustrates a first code decoding unit 620 in detail.

FIG. 22 illustrates the first code decoding unit 620 in detail.

As shown in FIG. 22, the first code decoding unit 620 includes, the hatched pattern detecting unit 570, the buffer memory 572, the first code detecting unit 576, the error correcting and decoding unit 578, and a skew angle detecting unit 622. In FIG. 22, the substantially same parts as those in FIG. 13 are represented by the same reference numerals.

In the first code decoding unit 620, the skew angle detecting unit 622 reads out image data stored in the buffer memory 572 at a predetermined timing, detects the skew angle using the Hough conversion, and outputs the same to the first code detecting unit 576. The first code detecting unit 576 reads out image data stored in the buffer memory 572 at a predetermined timing, and scans an image along a skew angle obtained by the skew angle detecting unit 574, acquires a pixel value corresponding to any one of bit "0" and bit "1", and detects a synchronous code from the acquired bit array.

Figure 23:
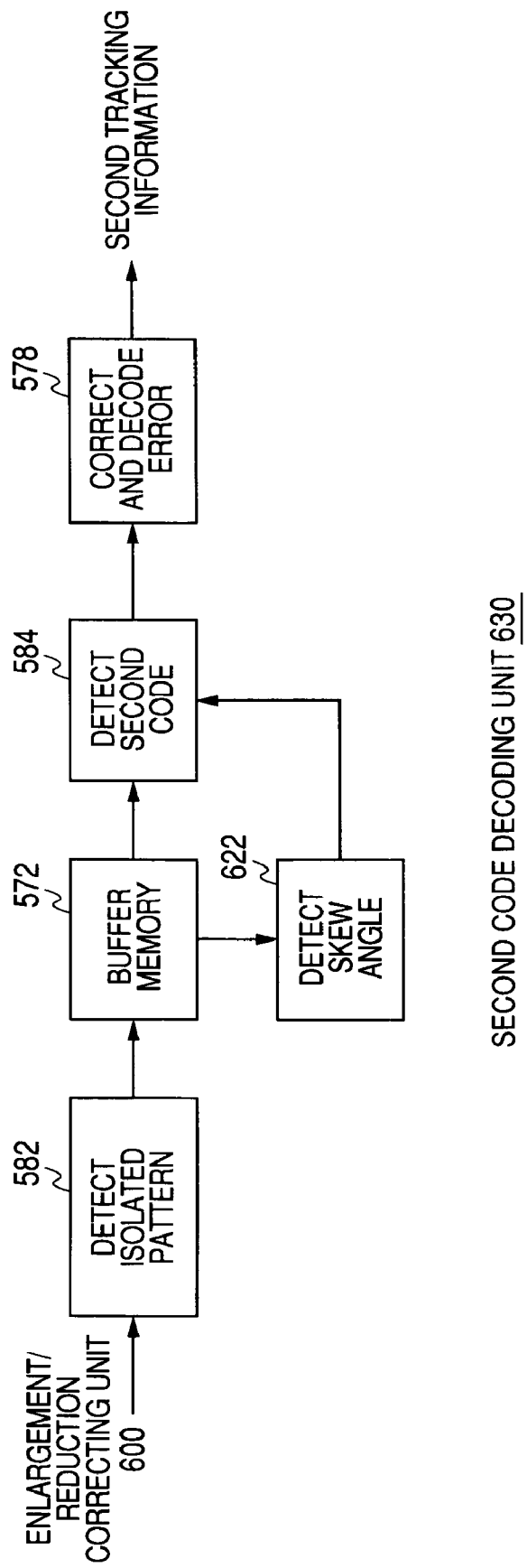
FIG. 23 illustrates a second code decoding unit 630 in detail.

FIG. 23 illustrates the second code decoding unit 630 in detail.

As shown in FIG. 23, the second code decoding unit 630 includes the isolated pattern detecting unit 582, the buffer memory 572, the second code detecting unit 584, the error correcting and decoding unit 578, and the skew angle detecting unit 622. In FIG. 22, the substantially same parts as those shown in FIG. 16 and FIG. 22 are represented by the same reference numerals.

In the second code decoding unit 630, the second code detecting unit 584 reads out pattern center image data stored in the buffer memory 572 at a predetermined timing, calculates the positional relation between the adjacent patterns on the basis of the skew angle obtained by the skew angle detecting unit 622, and detects the embedded bit value on the basis of the calculated distance.

FIG. 24 is a flowchart showing a tracking information detection process (S60) by the image processing system 2 according to this exemplary embodiment. In FIG. 24, the substantially same processes as those shown in FIG. 18 are represented by the same reference numerals.

As shown in FIG. 24, the original document is read in S500 to S508, where the grayscale converting process, the binarizing process and the noise eliminating process are performed.

In Step 600 (S600), the enlargement/reduction correcting unit 600 detects the magnification of enlargement/reduction from image data after the noise is eliminated and performs the process of either enlargement or reduction on the image on the basis of the magnification of enlargement/reduction.

The image data applied with the process of enlargement or the like is outputted to the first code decoding unit 620, and the first code decoding unit 620 performs the first tracking information decoding process to decode the first tracking information, and outputs the first tracking information to the controller 40.

The image data applied with the process of enlargement or the like is outputted to the second code decoding unit 630, and the second code decoding unit 630 performs the second tracking information decoding process to decode the second tracking information, and outputs the second tracking information to the controller 40.

In the first code decoding unit 620 and the second code decoding unit 630, the magnification correcting process is not performed. When the tracking information are not detected from the image, this event is outputted to the controller 40.

Then, in the process in S510, the detection result or the like is displayed on the UI apparatus 26.

As described above, the image processing system 2 detects the distance between the adjacent patterns, determines the magnification on the basis of the distance and preset distance, enlarges or reduces the image on the basis of the determined magnification, and detects information from the image applied with the process of enlargement or the like. Accordingly, the image processing system 2 can detect the embedded information from a copied document even when the original document in which information is embedded is copied in an enlarged scale or a reduced scale.

The image processing system 2 may determine the magnification on the basis of the size of the detected pattern. In this case, the image processing system 2 obtains the number of pixels of the pattern area (for example, β in FIG. 1B), and obtains a magnification of enlargement/reduction when the read original document is copied in an enlarged/reduced scale from the ratio between the obtained number of pixels in the pattern surface area and the number of pixels in the pattern surface area at the time of embedment. The image processing system 2 may obtain the plural numbers of pixels of the pattern surface areas, calculates the average value thereof, and obtains the magnification of enlargement/reduction from the ratio between the average value and the number of pixels in the pattern surface area at the time of embedment.

The foregoing description of the exemplary embodiments of the invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a pattern detecting unit that detects a plurality of patterns included in a read image, wherein predetermined information about the read image is embedded in the plurality of patterns;
    a magnification determining unit that determines and calculates a magnification of the reading the read image on the basis of positional relation between adjacent patterns out of the plurality of patterns detected by the pattern detecting unit; and
    an information detecting unit that detects and collects the predetermined information from the read image on the basis of the magnification determined by the magnification determining unit and the plurality of patterns detected by the pattern detecting unit.

2. The image processing apparatus according to claim 1, wherein the magnification determining unit determines the magnification by comparing a predetermined distance and a distance calculated between the adjacent patterns.

3. The image processing apparatus according to claim 1, wherein the magnification determining unit determines the magnification by applying a Hough conversion.

4. An image processing apparatus comprising:
    a pattern detecting unit that detects a plurality of patterns included in a read image, wherein predetermined information about the read image is embedded in the plurality of patterns;
    a magnification determining unit that determines and calculates a magnification of the reading the read image on the basis of size of the patterns detected by the pattern detecting unit; and
    an information detecting unit that detects and collects the predetermined information from the read image on the basis of the magnification determined by the magnification determining unit, the plurality of patterns detected by the pattern detecting unit, and positional relation between adjacent patterns out of the detected plurality of patterns.

5. An image forming apparatus comprising:
    a code image generating unit that generates a code image including a plurality of patterns of different shapes and indicating a predetermined information based on a positional relation between adjacent patterns out of the included plurality of patterns;
    an image composing unit that composes the code image generated by the code image generating unit and a document image to compose a composite image;

an output unit that outputs the composite image composed by the image composing unit;

a reading unit that reads a document image;

a pattern detecting unit that detects a plurality of patterns included in the document image read by the reading unit, wherein predetermined information about the document image is embedded in the plurality of patterns;

a magnification determining unit that determines and calculates a magnification of the reading the document image on the basis of positional relation between patterns being adjacent to each other out of the plurality of patterns detected by the pattern detecting unit; and an information detecting unit that detects and collects the predetermined information from the document image on the basis of the magnification determined by the magnification determining unit and the plurality of patterns detected by the pattern detecting unit.

6. An image processing method comprising:

detecting a plurality of patterns included in a read image, wherein predetermined information about the read image is embedded in the plurality of patterns;

determining and calculating a magnification of the reading the read image on the basis of positional relation between adjacent patterns out of the detected plurality of patterns; and detecting and collecting the predetermined information from the read image on the basis of the determined magnification and the detected plurality of patterns, wherein at least one of the steps is executed using a processor.

7. An image processing method comprising:

detecting a plurality of patterns included in a read image, wherein predetermined information about the read image is embedded in the plurality of patterns;

determining and calculating a magnification of the reading the read image on the basis of the size of the detected patterns; and detecting and collecting the predetermined information from the read image on the basis of the determined magnification, the detected plurality of patterns, and positional relation between adjacent patterns out of the detected plurality of patterns, wherein at least one of the steps is executed using a processor.

8. A computer readable medium storing a program causing a computer to execute a process for image processing, the process comprising:

detecting a plurality of patterns included in a read image, wherein predetermined information about the read image is embedded in the plurality of patterns;

determining and calculating a magnification of the reading the read image on the basis of positional relation between adjacent patterns out of the detected plurality of patterns; and detecting and collecting the predetermined information from the read image on the basis of the determined magnification and the detected plurality of patterns.

9. In an image processing system including a computer;

a computer readable medium, storing a program causing the computer to execute a process for executing image processing, the process comprising;

detecting a plurality of patterns included in a read image, wherein predetermined information about the read image is embedded in the plurality of patterns;

determining and calculating a magnification of the reading the read image on the basis of the size of the detected patterns; and detecting and collecting the predetermined information from the read image on the basis of the determined magnification, the detected plurality of patterns, and positional relation between adjacent pattern out of the plurality of patterns.

* * * * *